United States Patent
Kim et al.

(10) Patent No.: US 12,369,127 B2
(45) Date of Patent: Jul. 22, 2025

(54) METHOD AND APPARATUS FOR PERFORMING UPLINK TRANSMISSION IN WIRELESS COMMUNICATION SYSTEM

(71) Applicant: LG ELECTRONICS INC., Seoul (KR)

(72) Inventors: Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 261 days.

(21) Appl. No.: 17/949,948

(22) Filed: Sep. 21, 2022

(65) Prior Publication Data

US 2023/0113205 A1  Apr. 13, 2023

Related U.S. Application Data

(60) Provisional application No. 63/280,100, filed on Nov. 16, 2021.

(30) Foreign Application Priority Data

Sep. 29, 2021 (KR) .................. 10-2021-0129058
Jan. 7, 2022 (KR) .................. 10-2022-0002922

(51) Int. Cl.
   *H04W 52/14* (2009.01)
   *H04L 1/00* (2006.01)
   (Continued)

(52) U.S. Cl.
   CPC ......... *H04W 52/146* (2013.01); *H04L 1/1854* (2013.01); *H04W 72/23* (2023.01)

(58) Field of Classification Search
   None
   See application file for complete search history.

(56) References Cited

U.S. PATENT DOCUMENTS

| | | | | |
|---|---|---|---|---|
| 11,146,979 B2* | 10/2021 | Hwang | ............. | H04W 72/0446 |
| 11,558,873 B2* | 1/2023 | Lin | ........ | H04L 1/0003 |
| 11,764,908 B2* | 9/2023 | Kim | ...... | H04L 5/0048 |
| | | | | 370/329 |
| 11,929,830 B2* | 3/2024 | Hwang | .............. | H04W 72/23 |

(Continued)

FOREIGN PATENT DOCUMENTS

| | | | |
|---|---|---|---|
| WO | 2021161286 | 8/2021 | |
| WO | WO-2021161286 A1 * | 8/2021 | ........... H04L 1/0026 |

OTHER PUBLICATIONS

Huawei, 3GPP TSG RAN WG1 Meeting #104-e R1-2101992 e-Meeting, Jan. 25-Feb. 5, 2021. (Year: 2021).*

(Continued)

*Primary Examiner* — Pablo N Tran
(74) *Attorney, Agent, or Firm* — LEE, HONG, DEGERMAN, KANG & WAIMEY

(57) ABSTRACT

A method and apparatus for transmitting a PUCCH in a wireless communication system are disclosed. According to an embodiment of the present disclosure, the method includes receiving, from a base station, first configuration information related to time domain bundling, receiving, from the base station, at least one PDSCH in at least one PDSCH reception occasion, and transmitting, to the base station, a PUCCH including HARQ-ACK information for the at least one PDSCH, and transmission power for the PUCCH is based on a specific PDSCH among the at least one PDSCH, and the specific PDSCH is associated with a last SLIV among at least one SLIV included in a TDRA row indicated by DCI.

12 Claims, 12 Drawing Sheets

(51) Int. Cl.
    *H04L 1/16*     (2023.01)
    *H04L 1/18*     (2023.01)
    *H04L 1/1829*     (2023.01)
    *H04W 28/04*     (2009.01)
    *H04W 72/04*     (2023.01)
    *H04W 72/23*     (2023.01)

(56) References Cited

U.S. PATENT DOCUMENTS

| | | | |
|---|---|---|---|
| 12,003,337 B2* | 6/2024 | Lee | H04L 1/1822 |
| 12,095,566 B2* | 9/2024 | Hwang | H04L 1/1812 |
| 2022/0132545 A1* | 4/2022 | Lee | H04L 1/1854 |
| 2022/0167320 A1* | 5/2022 | Lee | H04L 1/1671 |
| 2023/0337216 A1* | 10/2023 | Park | H04W 72/121 |
| 2024/0357496 A1* | 10/2024 | Kim | H04L 1/1812 |

OTHER PUBLICATIONS

Japan Patent Office Application No. 2022-155291, Notice of Allowance dated Dec. 12, 2023, 2 pages.
Intel Corporation, "Discussion on PDSCH/PUSCH enhancements for extending NR up to 71 GHz," 3GPP TSG RAN WG1 #106-e, R1-2108334, Aug. 2021, 28 pages.
NTT Docomo Inc., "PDSCH/PUSCH enhancements for NR from 52.6 to 71 Ghz," 3GPP TSG RAN WG1 Meeting #105-e, R1-2105690, May 2021, 10 pages.
Apple Inc., "Discussion on multi-PxSCH and HARQ Codebook Enhancements," 3GPP TSG RAN WG1 #104-e, R1-2105094, Apr. 2021, 17 pages.
European Telecommunications Standards Institute (ETSI), "5G; NR: Physical layer procedures for control (3GPP TS 38.213 version 16.7.0 Release 16)," ETSI TS 138 213 V16.7.0 Oct. 2021, 191 pages.
Korean Intellectual Property Office Application No. 10-2022-0109127, Office Action dated Mar. 12, 2025, 5 pages.
Moderator (LG Electronics), "Summary #3 of PDSCH/PUSCH enhancements (Scheduling/HARQ)", R1-2104042, 3GPP TSG RAN WG1 #104b-e, Apr. 2021, 81 pages.
CATT, "Correction on power control for HARQ-ACK transmission", R1-2100332, 3GPP TSG RAN WG1 #104-e, Feb. 2021, 9 pages.

* cited by examiner (a)

(b)

METHOD AND APPARATUS FOR PERFORMING UPLINK TRANSMISSION IN WIRELESS COMMUNICATION SYSTEM

CROSS-REFERENCE TO RELATED APPLICATIONS

Pursuant to 35 U.S.C. § 119, this application claims the benefit of earlier filing date and right of priority to Korean Application Nos. 10-2021-0129058, filed on Sep. 29, 2021, 10-2022-0002922, filed on Jan. 7, 2022, and also claims the benefit of U.S. Provisional Application No. 63/280,100, filed Nov. 16, 2021, the contents of which are all incorporated by reference herein in their entireties.

TECHNICAL FIELD

The present disclosure relates to a wireless communication system, and more particularly, to a method and apparatus for performing uplink transmission/reception based on time domain bundling in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and apparatus for performing uplink transmission/reception in a wireless communication system.

An additional technical object of the present disclosure is to provide a method and apparatus for determining transmission power of a PUCCH including HARQ-ACK information when time domain bundling is configured.

The technical objects to be achieved by the present disclosure are not limited to the above-described technical objects, and other technical objects which are not described herein will be clearly understood by those skilled in the pertinent art from the following description.

Technical Solution

In an embodiment of the present disclosure, a method of transmitting a physical uplink control channel (PUCCH) by a user equipment (UE) in a wireless communication system may include receiving, from a base station, first configuration information related to time domain bundling, receiving, from the base station, at least one PDSCH in at least one physical downlink shared channel (PDSCH) reception occasion and transmitting, to the base station, a PUCCH including HARQ-ACK information for the at least one PDSCH, and transmission power for the PUCCH is based on a specific PDSCH among the at least one PDSCH, and the specific PDSCH is associated with a last SLIV (start and length indicator value) among at least one SLIV included in a time domain resource allocation (TDRA) row indicated by downlink control information (DCI).

In an embodiment of the present disclosure, a method of receiving a physical uplink control channel (PUCCH) in a wireless communication system may include transmitting, to a user equipment (UE), first configuration information related to time domain bundling, transmitting, to the UE, at least one PDSCH in at least one physical downlink shared channel (PDSCH) reception occasion and receiving, from the UE, a PUCCH including HARQ-ACK information for the at least one PDSCH, and transmission power for the PUCCH is based on a specific PDSCH among the at least one PDSCH, and the specific PDSCH is associated with a last SLIV (start and length indicator value) among at least one SLIV included in a time domain resource allocation (TDRA) row indicated by downlink control information (DCI).

[Technical Effects]

According to an embodiment of the present disclosure, a method and an apparatus for performing uplink transmission/reception may be provided in a wireless communication system.

According to an embodiment of the present disclosure, when time domain bundling is configured, a method and apparatus for determining transmission power of a PUCCH including HARQ-ACK information may be provided.

According to an embodiment of the present disclosure, stable HARQ-ACK feedback may be performed by determining the transmission power of the PUCCH based on the number of bits of HARQ-ACK information.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
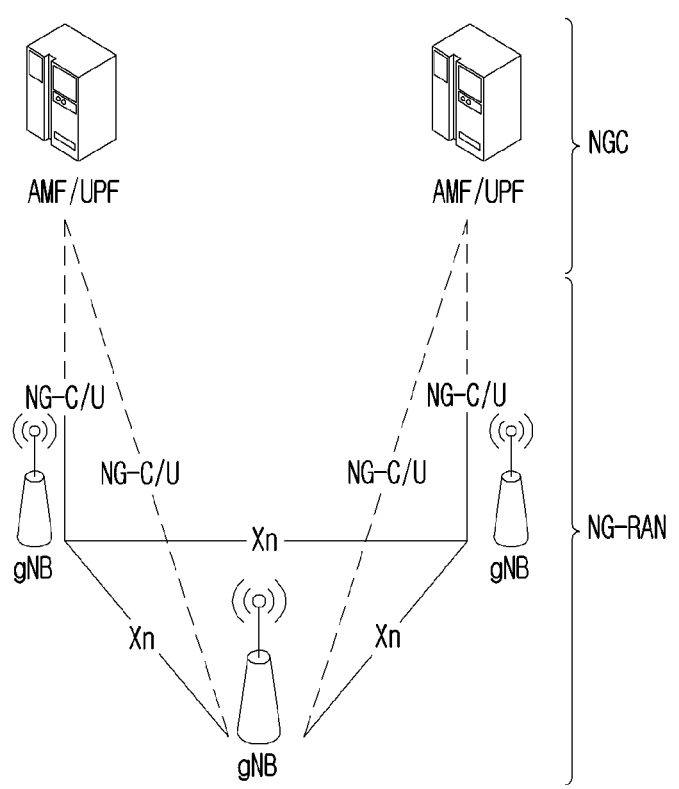
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT (Wireless terminal), an MTC (Machine-Type Communication) device, an M2M(Machine-to-Machine) device, a D2D(Device-to-Device) device, a vehicle, an RSU (road side unit), a robot, an AI (Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS (access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
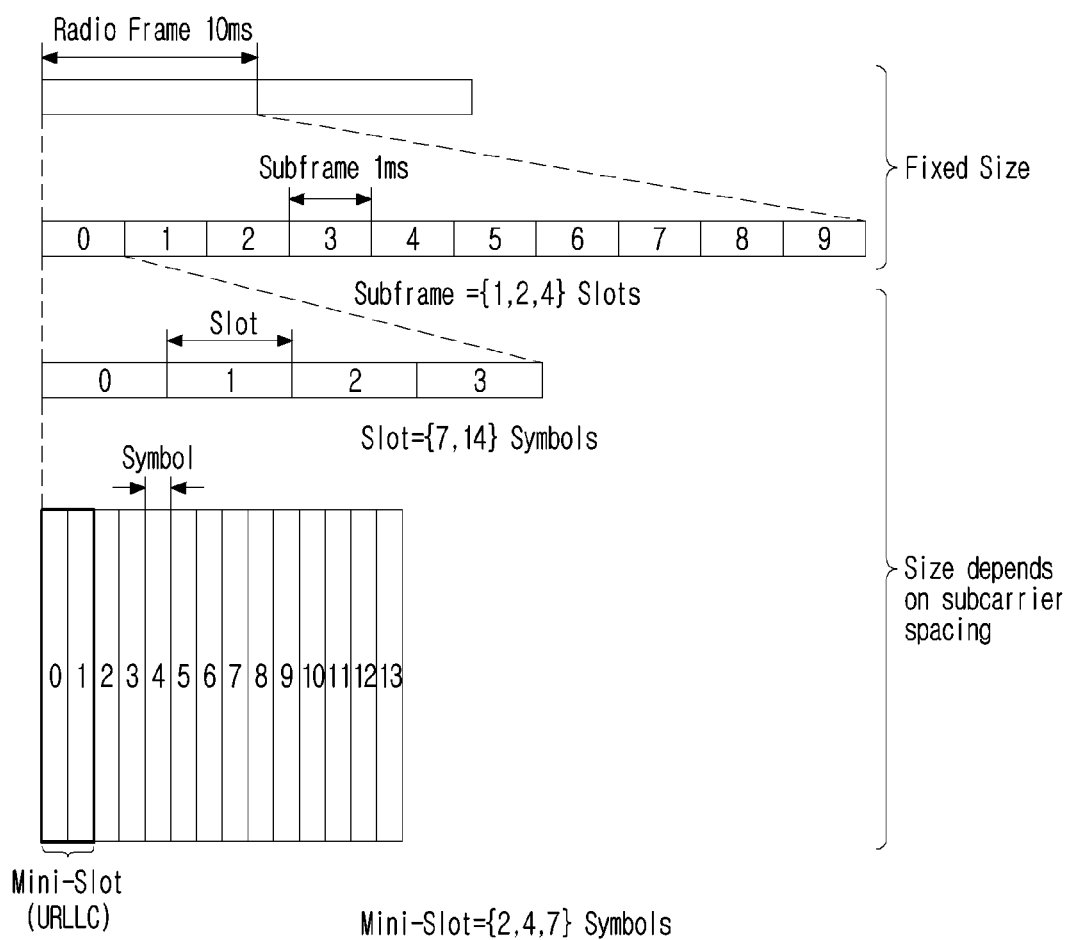
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$·15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta fmaxNf/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink.

In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe.

All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on p=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship.

In this case, the large-scale property includes at least one of delay spread, doppler spread, frequency shift, average received power, received timing.

Figure 3:
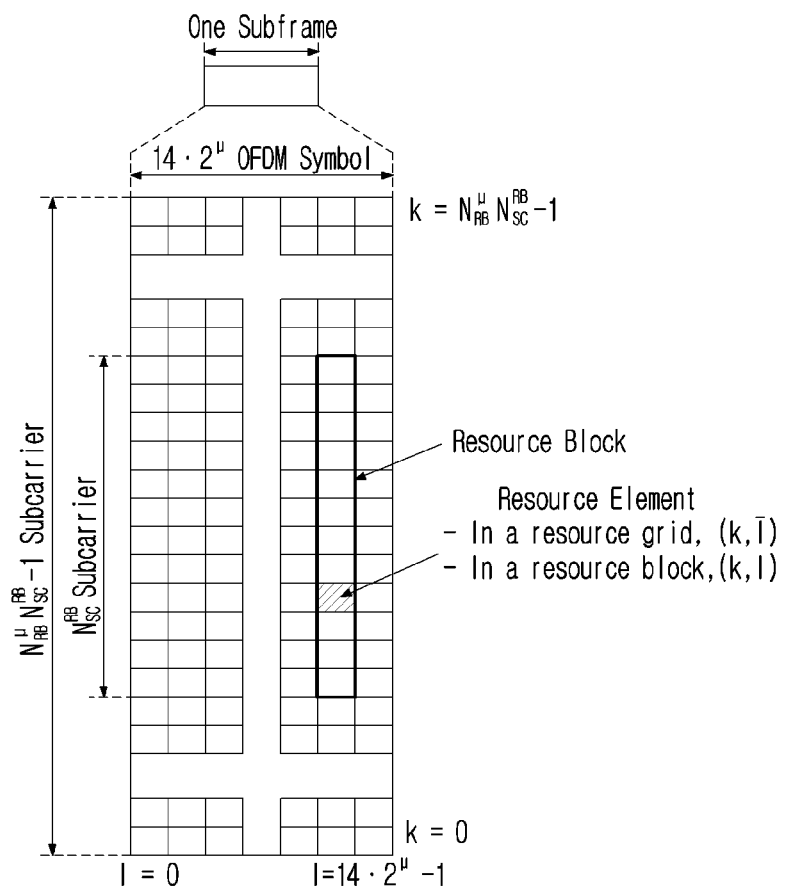
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with 14·$2^μ$ OFDM symbols, but it is not limited thereto.

In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k, l').

Here, $k=0, \ldots, N_{RB}^μ N_{sc}^{RB}-1$ is an index in a frequency domain and $l'=0, \ldots, 2^μ N_{symb}^{(μ)}-1$ refers to a position of a symbol in a subframe. When referring to a resource element in a slot, an index pair (k,l) is used. Here, $l=0, \ldots, N_{symb}^μ-1$. A resource element (k,l') for p and an antenna port p corresponds to a complex value, $a_{k,l'}^{(p,μ)}$.

When there is no risk of confusion or when a specific antenna port or numerology is not specified, indexes p and p may be dropped, whereupon a complex value may be $a_{k,l'}^{(p)}$ or $a_{k,l}$. In addition, a resource block (RB) is defined as $N_{sc}^{RB}=12$ consecutive subcarriers in a frequency domain. Point A plays a role as a common reference point of a resource block grid and is obtained as follows. offset- ToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number).

Common resource blocks are numbered from 0 to the top in a frequency domain for a subcarrier spacing configuration p. The center of subcarrier 0 of common resource block 0 for a subcarrier spacing configuration p is identical to 'point A'.

A relationship between a common resource block number nCRBp and a resource element (k,l) for a subcarrier spacing configuration p in a frequency domain is given as in the following Equation 1.

$$n_{CRB}^{\mu} = \left\lfloor \frac{k}{N_{sc}^{RB}} \right\rfloor$$ [Equation 1]

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $nc_R$ in BWP i is given by the following Equation 2.

$$n_{CRB}^{\mu} = n_{PRB}^{\mu} + N_{BWP,i}^{start,\mu}$$ [Equation 2]

$N_{BWP,i}^{start,\mu}$ is a common resource block that a BWP starts relatively to common resource block 0.

Figure 4:
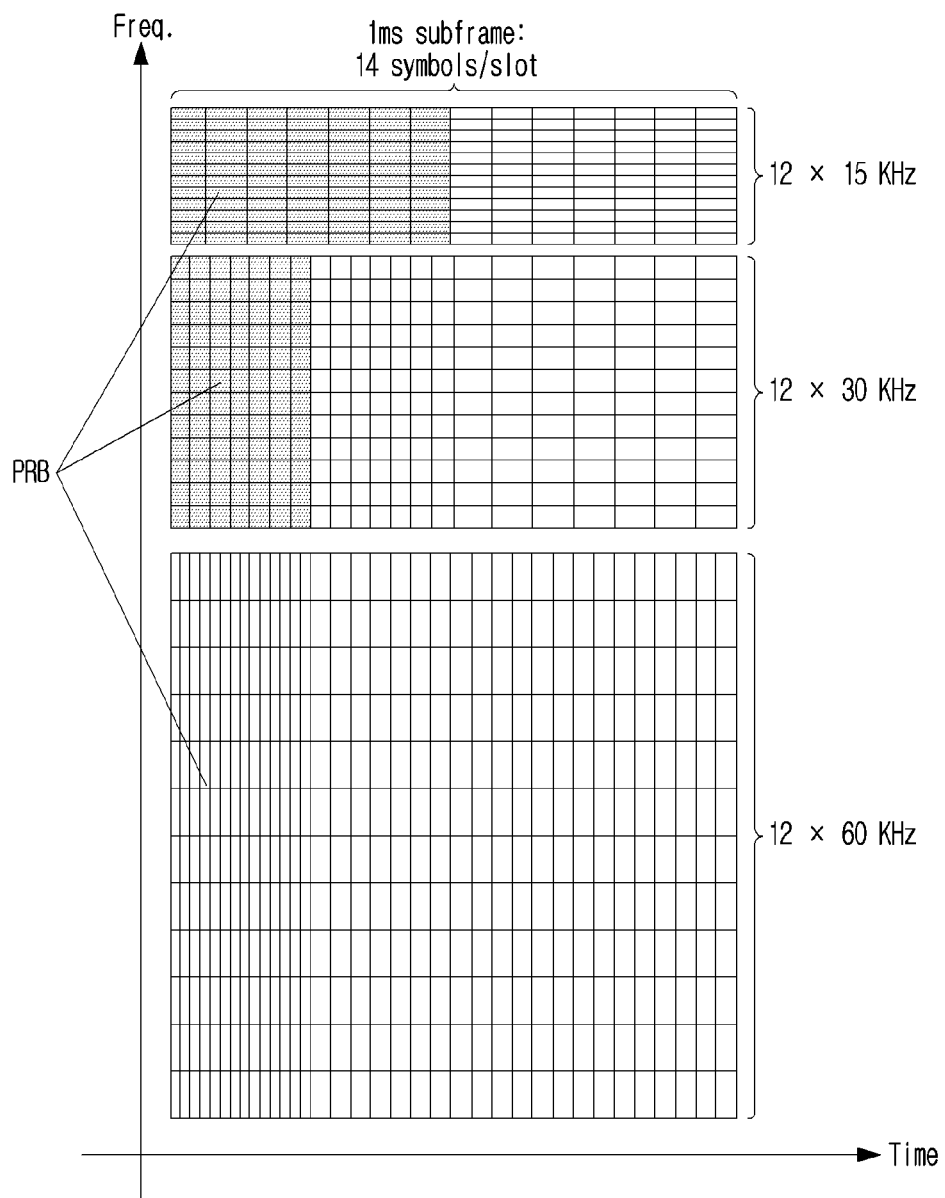
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
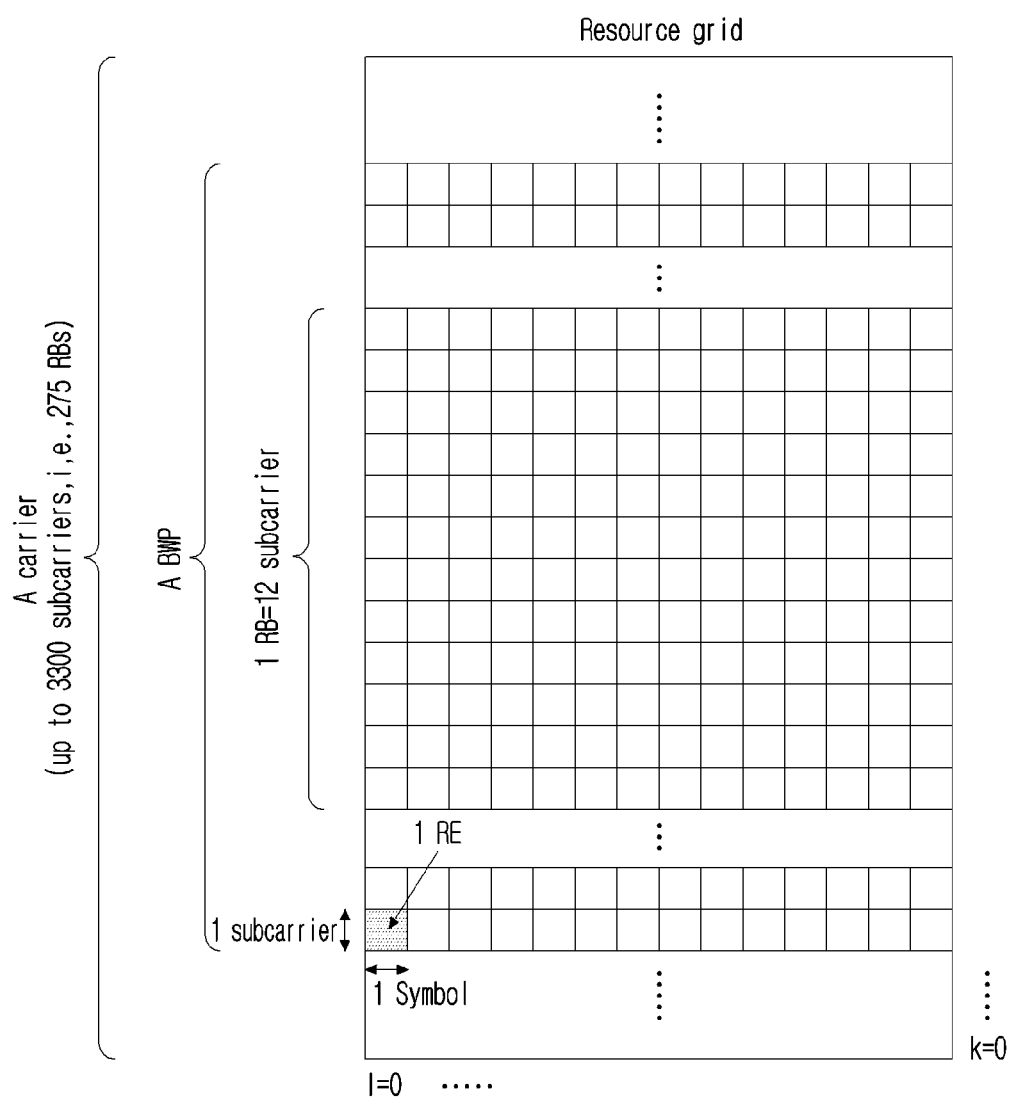
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.).

A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC.

Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot.

In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.).

Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
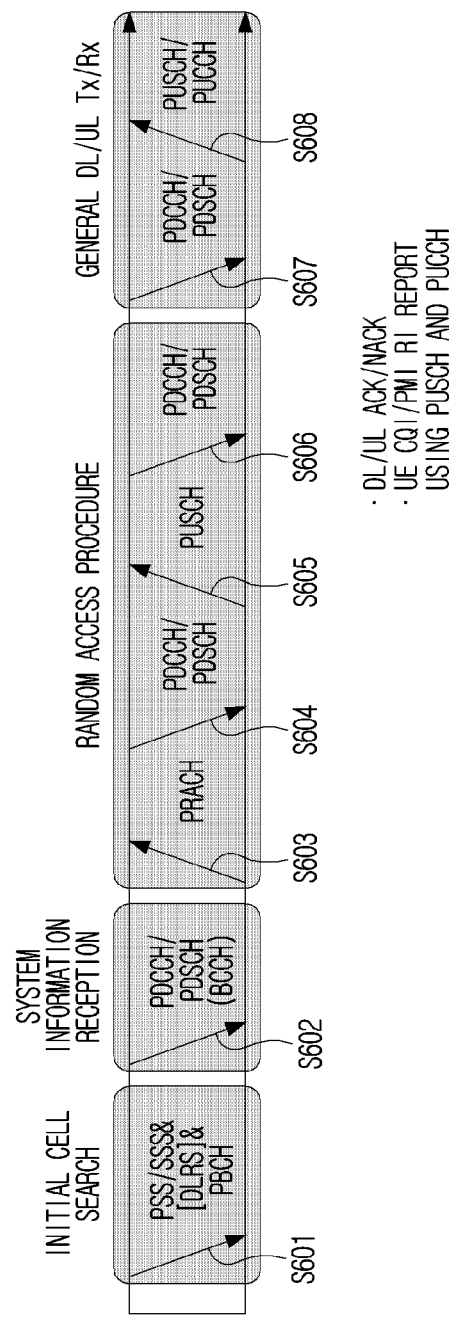
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI (Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
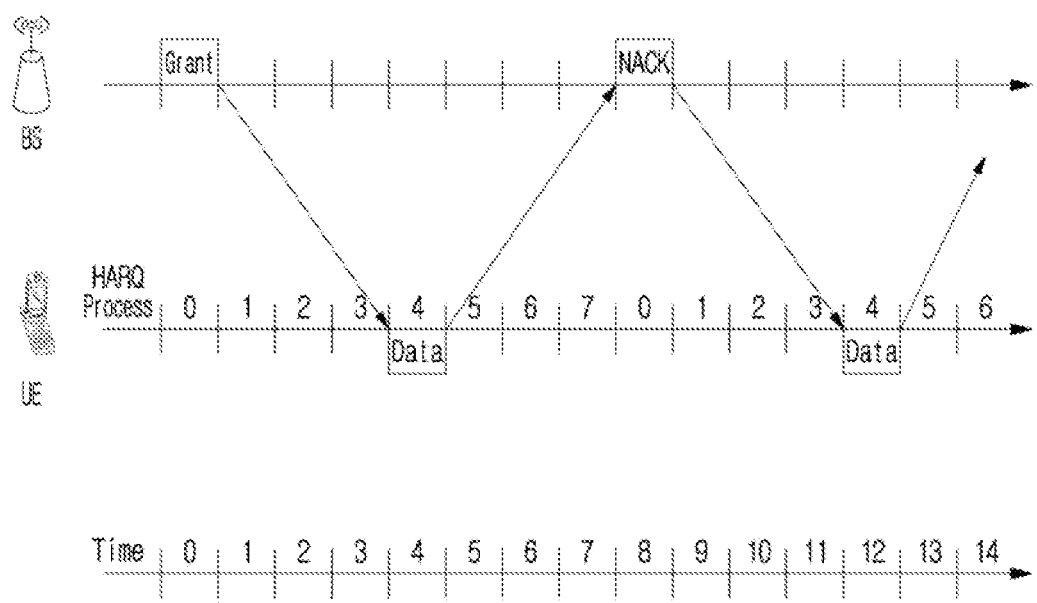
FIG. 7 illustrates a process in which a user equipment (UE) and a base station transmit and receive HARQ-ACK in a wireless communication system to which the present disclosure may be applied.

FIG. 7 illustrates a hybrid automatic repeat and request (HARQ) transmission method to which the present disclosure may be applied.

When a plurality of terminals having data to be transmitted through uplink (UL)/downlink (DL) exist in a wireless communication system, the base station may select a terminal to transmit data to for each TTI (transmission time interval) (e.g., subframe, slot). In a multi-carrier and similarly operated wireless communication system, the base station may select terminals to transmit data through UL/DL for each TTI, and may also select a frequency band to be used by the corresponding terminal to transmit data.

For example, the terminals may transmit RS (or pilot signals) through the UL, and the base station may determine the channel state of the terminals using the RS (or pilot signals) transmitted from the terminals. In addition, the base station may select terminals to transmit data in the UL in the unit frequency band for each TTI, and transmit the selection result to the terminal. That is, the base station may transmit an uplink assignment message (i.e., a UL grant message) to a terminal scheduled for UL at a specific TTI by using a specific frequency band.

The terminal may transmit data to the base station according to the UL grant message. Here, the UL grant message may include, for example, terminal(or, UE) Identity, RB allocation information, MCS (Modulation and Coding Scheme), Redundancy Version (RV) version, New Data indication (NDI), and the like.

HARQ may include DL HARQ and UL HARQ. DL HARQ may mean DL data on PDSCH transmitted together with HARQ-ACK returned on PUCCH or PUSCH. UL HARQ may mean UL data on PUSCH transmitted together with HARQ-ACK returned on PDCCH.

A plurality of parallel HARQ processes may exist in the base station/terminal for DL/UL transmission. A plurality of parallel HARQ processes may allow DL/UL transmissions to be continuously performed while waiting for HARQ feedback on successful or non-successful reception of previous DL/UL transmissions.

Each HARQ process may be associated with a HARQ buffer of a MAC (Medium Access Control) layer. Each HARQ process may manage state variables related to the number of transmissions of a MAC PDU (physical data block) in the buffer, HARQ feedback for the MAC PDU in the buffer, and a current redundancy version.

For example, when using 8-channel HARQ, the HARQ process ID may be provided as 0-7. In the synchronous HARQ scheme, the HARQ process ID may be sequentially connected to a time unit (TU). On the other hand, in the asynchronous HARQ scheme, the HARQ process ID may be designated by a network (e.g., a base station) during data scheduling. Here, the TU may be replaced with a data transmission occasion (e.g., subframe, slot).

Among HARQ transmission schemes, an asynchronous HARQ scheme may mean that a fixed time pattern for each HARQ process does not exist. That is, since the HARQ retransmission time is not predefined, the base station may transmit a retransmission request message to the terminal.

Among HARQ transmission schemes, a synchronous HARQ scheme may have a fixed time pattern for each HARQ process. That is, the HARQ retransmission time may be predefined. Accordingly, the UL grant message transmitted from the base station to the terminal may be transmitted only initially, and subsequent retransmission may be performed by the ACK/NACK signal.

Among HARQ transmission schemes, in the case of the non-adaptive HARQ scheme, the frequency resource or MCS for retransmission is the same as the previous transmission, but in the case of the adaptive HARQ scheme, the frequency resource or MCS for retransmission may be different from the previous transmission. For example, in the case of the asynchronous adaptive HARQ scheme, since the frequency resource or MCS for retransmission varies for each transmission time, the retransmission request message may include UE ID, RB allocation information, HARQ process ID/number, RV, and NDI information.

Referring to FIG. 7, a base station (BS) may transmit a UL grant message to a UE through a PDCCH. The UE may transmit uplink data to the base station through the PUSCH using the RB and the MCS designated by the UL grant message after a predetermined time from the time of receiving the UL grant message.

Here, each of the base station and the UE shown in FIG. 7 may correspond to one of the first device 100 or the second device 200, which will be described with reference to FIG. 12.

The base station may decode the UL data received from the UE. When decoding of uplink data fails, the base station may transmit a NACK to the UE. The UE may retransmit the UL data after a predetermined time from the time of receiving the NACK. Initial transmission and retransmission of UL data may be performed by the same HARQ process (e.g., HARQ process 4).

In the synchronous HARQ scheme, the predetermined time may have a fixed value. On the other hand, in the synchronous HARQ scheme, the predetermined time may be indicated by PDCCH-to-PUSCH timing indication information in a UL grant message.

Figure 8:
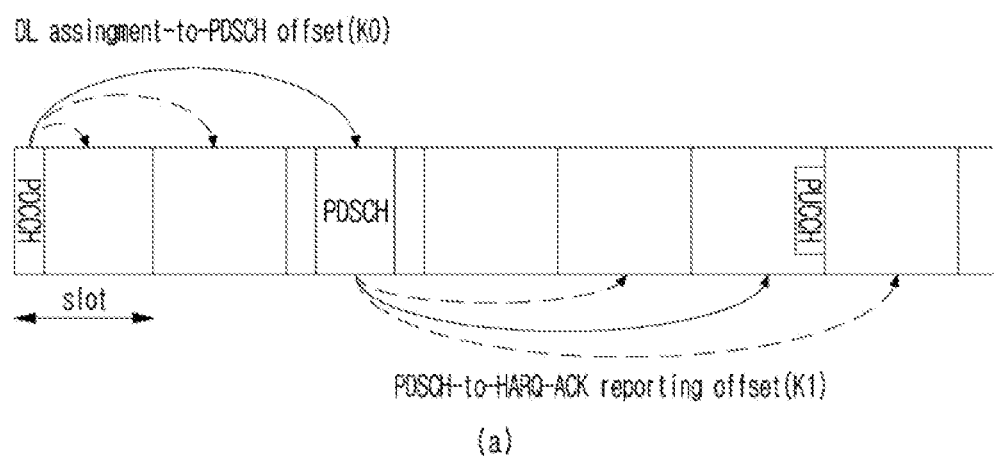
FIG. 8 illustrates an uplink and/or downlink transmission/reception process based on DCI in a wireless communication system to which the present disclosure may be applied.
Figure 8:
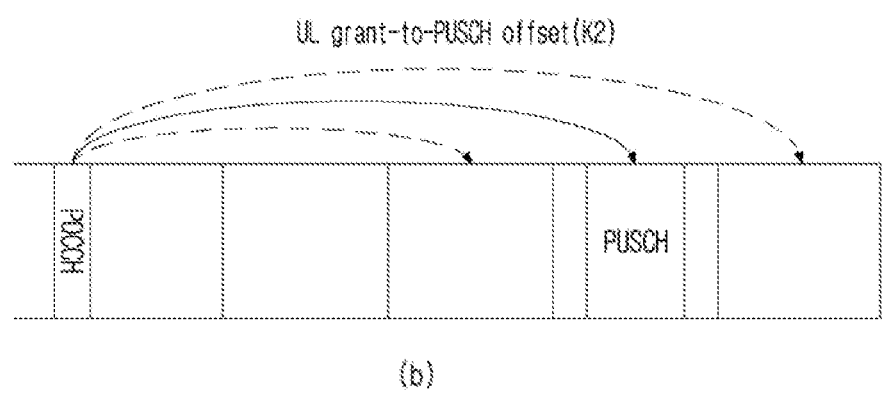

FIG. 8 illustrates a transmission process of uplink control information to which the present disclosure may be applied.

Referring to FIG. 8(a), the UE may detect the PDCCH in slot #n. Here, the PDCCH includes DL scheduling information (e.g., DCI formats 1_0, 1_1), and the PDCCH may indicate DL assignment-to-PDSCH offset (K0)' and 'PDSCH-HARQ-ACK reporting offset (K1)'.

Here, each of K0 and K1 may be indicated by a 'time domain resource assignment (TDRA) field' and a 'PDSCH-to-HARQ feedback timing indicator field' of DCI formats 1_0 and 1_1.

Specifically, the 'TDRA field' may indicate the start position (e.g., OFDM symbol index) and length (e.g., the number of OFDM symbols) of the PDSCH in the slot. The 'PDSCH-to-HARQ feedback timing indicator field' may indicate a position where HARQ-ACK reporting starts after the PDSCH is received.

And, DCI formats 1_0 and 1_1 include a 'PUCCH resource indicator (PRI) field' indicating a PUCCH resource to be used for UCI transmission among a plurality of PUCCH resources included in the PUCCH resource set.

After receiving the PDSCH from the base station in slot #(n+K0) according to the scheduling information of slot #n, the UE may transmit UCI to the base station through PUCCH in slot # (n+K1).

Here, the UCI may include HARQ-ACK feedback for the PDSCH. When the PDSCH is configured to transmit a maximum of 1 TB, the HARQ-ACK feedback may be configured with 1-bit. When the PDSCH is configured to transmit up to two TBs, the HARQ-ACK bit may be configured as 2-bits when spatial bundling is not configured, and may be configured as 1-bits when spatial bundling is configured. When the HARQ-ACK transmission time for a plurality of PDSCHs is designated as slot #(n+K1), the UCI transmitted in slot #(n+K1) may include HARQ-ACK responses for the plurality of PDSCHs.

Referring to FIG. 8(b), the UE may detect the PDCCH in slot #n. Here, the PDCCH may include uplink scheduling information (e.g., DCI formats 0_0, 0_1).

DCI format 0_0, 0_1 may include a frequency domain resource assignment (FDRA) field indicating an RB set allocated to a PUSCH, a slot offset (K2), and a time domain resource assignment (TDRA) field indicating a start position (e.g., OFDM symbol index) and length (e.g., the number of OFDM symbols) of a PUSCH in a slot. Here, the start position and length of the PUSCH may be indicated together through a start and length indicator value (SLIV) or may be indicated respectively.

The UE may transmit the PUSCH to the base station in slot #(n+K2) according to the scheduling information of slot #n. Here, the PUSCH may include a UL-SCH TB. When the PUCCH transmission time and the PUSCH transmission time overlap, the UCI may be transmitted through the PUSCH (i.e., piggybacked to the PUSCH).

Dynamic/Semi-Static HARQ-ACK Codebook Configuration Method

In a wireless communication system, a dynamic HARQ-ACK codebook (e.g., Type-2 HARQ-ACK codebook) configuration scheme and a semi-static HARQ-ACK codebook (e.g., Type-1 HARQ-ACK codebook) configuration scheme may be supported. In describing the present disclosure, the HARQ-ACK (or A/N) codebook may be replaced with a HARQ-ACK payload.

When the dynamic HARQ-ACK codebook configuration method is configured, the size of the A/N payload may vary according to the actual number of scheduled DL data. To this end, the PDCCH related to DL scheduling may include a counter-DAI (Downlink Assignment Index) and total-DAI.

The counter-DAI indicates a {CC, slot} scheduling order value calculated in a CC (Component Carrier) (or cell)-first method, and may be used to designate the position of the A/N bit in the A/N codebook. total-DAI represents a slot-unit scheduling cumulative value up to the current slot, and may be used to determine the size of the A/N codebook.

When the semi-static A/N codebook configuration method is configured, the size of the A/N codebook may be fixed (to the maximum value) regardless of the actual number of scheduled DL data.

Specifically, the (maximum) A/N payload (size) transmitted through one PUCCH in one slot may be determined as the number of A/N bits corresponding to a combination of all CCs configured for the UE and all DL scheduling slots (or PDSCH transmission slot or PDCCH monitoring slot) (hereafter, the bundling window) to which the A/N transmission timing may be indicated.

For example, the DL grant DCI includes PDSCH-to-A/N timing information, and the PDSCH-to-A/N timing information may have one of a plurality of values (e.g., k). For example, when a PDSCH is received in slot #m, and PDSCH-to-A/N timing information in a DL grant DCI (PDCCH) scheduling the PDSCH indicates k, A/N information for the PDSCH may be transmitted in slot #(m+k).

As an example, $k \in \{1, 2, 3, 4, 5, 6, 7, 8\}$ may be given. When the A/N information is transmitted in slot #n, the A/N information may include the maximum possible A/N based on the bundling window. That is, A/N information of slot #n may include A/N corresponding to slot #(n-k).

For example, if $k \in \{1, 2, 3, 4, 5, 6, 7, 8\}$, the A/N information of slot #n includes A/N (i.e., the maximum number of A/Ns) corresponding to slots #(n-8) to #(n-1) regardless of actual DL data reception. Here, the A/N information may be replaced with an A/N codebook and an A/N payload.

In addition, the slot may be understood/replaced as a candidate occasion for DL data reception. As an example, the bundling window may be determined based on the PDSCH-to-A/N timing based on the A/N slot, and the PDSCH-to-A/N timing set may have a pre-defined value (e.g., $\{1, 2, 3, 4, 5, 6, 7, 8\}$) or may be configured by higher layer (RRC) signaling.

harq-ACK Codebook Configuration Method Based on Time Bundling Interval Configuration In order to increase the transmission efficiency of the scheduling DCI for the PDSCH, a plurality of PDSCH scheduling may be supported through one DCI. For convenience of description of the present disclosure, the corresponding DCI is referred to as M-DCI, and the DCI for scheduling a single PDSCH is referred to as S-DCI. However, a single PDSCH may be scheduled by M-DCI.

For example, when the time domain resource allocation (TDRA) entry of M-DCI is configured, it is assumed that only one SLIV is linked to row index #A, and a plurality of SLIVs are linked to another row index #B. When row index #A is indicated by M-DCI, M-DCI may schedule only a single PDSCH. On the other hand, when row index #B is indicated by M-DCI, M-DCI may schedule a plurality of PDSCHs.

And, for convenience of description of the present disclosure, a case in which a PDSCH is scheduled by S-DCI and a case in which only one PDSCH is scheduled by M-DCI (or, when SPS PDSCH release, secondary cell (SCell) dormancy, or TCI status update is indicated by DCI) is referred to as a single PDSCH case. And, a case in which a plurality of PDSCHs are scheduled by M-DCI is referred to as a multi-PDSCH case.

In addition, when time bundling is configured in addition to the M-DCI configuration, the number of bundling groups may be defined as G. For example, when a plurality of PDSCHs are scheduled through M-DCI in a cell in which G is configured to 1, this may be referred to as a single PDSCH case. And, when a plurality of PDSCHs are scheduled through M-DCI in a cell in which G is configured to a value greater than 1, this may be referred to as a multi-PDSCH case.

On the other hand, when a plurality of PDSCHs are scheduled in a plurality of time domains (e.g., slot domains) by M (multi)-DCI in consideration of 480/960 kHz SCS applicable to FR 2-2 band (or FR 3 band) (e.g. 52.6 GHz or higher, etc.), the absolute time for PDSCH transmission may be quite short. Since channel information related to a plurality of PDSCHs may not be significantly changed in a corresponding time domain, a plurality of PDSCH decoding results by the UE may be the same.

When the time bundling period is configured in consideration of the above-described situation, HARQ-ACK information/result for the PDSCH in the corresponding time bundling period may be bundled (e.g., logical AND operation is performed on HARQ-ACK information), and thus the HARQ-ACK payload may be reduced. Hereinafter, the time bundling method will be described in detail.

As method 1, time bundling may be performed based on the number of scheduled PDSCHs. For example, when M or less multi-PDSCHs are scheduled, the corresponding multi-PDSCHs may be bundled into one group. When more than M multi-PDSCHs are scheduled, the multi-PDSCHs may be divided into two groups and bundled.

In this case, the M value may be half of the maximum number of PDSCHs that may be scheduled by M-DCI configured in the corresponding cell (or all cells configured for the UE). When half of the maximum number of PDSCHs is not an integer, the M value may be an integer value obtained by applying a floor function, a ceiling function, or rounding to half of the maximum number of PDSCHs. However, this is only an embodiment, and the M value may be configured by higher layer signaling.

Specifically, when the number of PDSCHs that are actually scheduled is N (in this case, N>M), the first M PDSCHs may be bundled into group 1, and the remaining N-M PDSCHs may be bundled into group 2. As another example, the first ceil (N12) PDSCHs may be bundled into group 1, and the remaining floor (N/2) PDSCHs may be bundled into group 2.

As method 2, time bundling may be performed based on the number of slots occupied by the PDSCH. For example, when L or less multi-PDSCHs are scheduled, the corresponding multi-PDSCHs may be bundled into one group. When more than L multi-PDSCHs are scheduled, the multi-PDSCHs may be divided into two groups and bundled.

In this case, the L value may be half of the maximum number of PDSCH slots that can be scheduled by M-DCI configured in the corresponding cell (or all cells configured for the UE). When half of the maximum number of PDSCHs is not an integer, the M value may be an integer value obtained by applying a floor function, a ceiling function, or rounding to half of the maximum number of PDSCHs. However, this is only an embodiment, and the L value may be set by higher layer signaling.

Specifically, when the slot duration from the first slot of the actually scheduled first PDSCH to the slot of the last PDSCH consists of K (K>L) slots, PDSCHs in the first L slot durations may be bundled into group 1, and PDSCHs in the remaining K-L slot durations may be bundled into group 2. As another method, PDSCHs in the first ceil (K/2) slot durations may be bundled into group 1, and PDSCHs in the remaining floor (K/2) slot durations may be bundled into group 2.

As method 3, regardless of the number of PDSCHs and the number of slots, PDSCHs may be time-bundled into two groups. For example, when the number of actually scheduled PDSCHs is N, the first ceil (N/2) PDSCHs may be bundled into group 1, and the remaining floor (N/2) PDSCHs may be bundled into group 2.

Additionally or alternatively, G groups may be established. And, according to a scheduled (or valid) order, PDSCHs may be mapped to each group (e.g., in an ascending order of a group index).

As an example, when 5 PDSCHs are scheduled (or valid) and G is configured to 4, PDSCH #0/#4 may correspond(or map) to group #0, PDSCH #1 may correspond to group #1, PDSCH #2 may correspond to group #2, and PDSCH #3 may correspond to group #3. In this case, the valid PDSCH may mean a PDSCH that does not overlap with a symbol (or a slot including the corresponding symbol) configured as uplink (or flexible) by a parameter related to TDD UL/DL configuration (e.g., 'tdd-UL-DL-ConfigurationCommon' or/and 'tdd-UL-DL-ConfigurationDedicated').

An example in which the number of groups is 2 in Methods 1 to 3 is described. However, this is only an embodiment, and even when the number of groups exceeds 1 or 2, the operations/information according to Methods 1 to 3 may be applied.

Type-1 HARQ-ACK Codebook Configuration Method when Time Bundling is Configured

Among a plurality of PDSCHs scheduled by M-DCI, the K1 value may be applied based on the slot in which the last PDSCH is transmitted (on the time domain).

Here, the K1 value means a slot interval between the PDSCH transmission slot and the HARQ-ACK transmission slot for the corresponding PDSCH reception, and may be indicated by DCI.

That is, the HARQ-ACK timing (slot) may be determined by applying K1 based on the slot in which the last PDSCH is transmitted among a plurality of PDSCHs scheduled by M-DCI. In addition, HARQ-ACK feedback for all of the plurality of PDSCHs scheduled from M-DCI may be collectively transmitted at the corresponding HARQ-ACK timing (the same one).

Accordingly, HARQ-ACK feedback for all of the plurality of PDSCHs scheduled by M-DCIs (or/and S-DCIs indicating HARQ-ACK timing corresponding to the slot in which the PDSCH is transmitted) indicating (in the same slot) the HARQ-ACK timing corresponding to the slot in which the last PDSCH is transmitted may be multiplexed. And, all of the multiplexed HARQ-ACKs may be transmitted at the same single HARQ-ACK timing.

As an example, it is assumed that a set of a plurality of (e.g., K_N) K1 value candidates is configured. In the case of a type-1 HARQ-ACK codebook in a basic wireless communication system, by calculating the combination of all PDSCH occasions (SLIVs) transmittable in the previous DL slot (e.g., K1 DL slots) from the slot in which the HARQ-ACK corresponding to each K1 value (configured for each serving cell) is transmitted, occasions for candidate PDSCH receptions corresponding to each DL slot (including determination of the position/order of the HARQ-ACK bit corresponding to each SLIV) may be configured (i.e., SLIV pruning).

Here, SLIV is an indication value for a start symbol index and the number of symbols in a slot of the PDSCH and/or PUSCH. It may be configured as a component of an entry constituting a TDRA field in a PDCCH for scheduling the corresponding PDSCH and/or PUSCH.

A HARQ-ACK information bit may be configured for each occasion included in the set of occasions for candidate PDSCH receptions. As the HARQ-ACK information is concatenated as shown in Table 6 below, the entire HARQ-ACK codebook may be configured.

TABLE 6

A UE determines $\tilde{o}_0^{ACK}, \tilde{o}_1^{ACK}, \ldots, \tilde{o}_{O^{ACK}-1}^{ACK}$ HARQ−ACK information bits, for a total number of $O_{ACK}$ HARQ-ACK information bits, of a HARQ-ACK codebook for transmission in a PUCCH according to the following pseudo-code. In the following pseudo-code, if the UE does not receive a transport block or a CBG, due to the UE not detecting a corresponding DCI format, the UE generates a NACK value for the transport block or the CBG. The cardinality of the set $M_{A,c}$ defines a total number $M_c$ of occasions for PDSCH reception or SPS PDSCH release for serving cell c corresponding to the HARQ-ACK information bits.
Set c=0 − serving cell index: lower indexes correspond to lower RRC indexes of corresponding cells including, when applicable, cells in the set $S_0$ and the set $S_1$
Set j = 0 − HARQ-ACK information bit index
Set $N_{cells}^{DL}$ to the number of serving cells configured by higher layers for the UE while c < $N_{cells}^{DL}$
Set m = 0 − index of occasion for candidate PDSCH reception or SPS PDSCH release while m < $M_c$
if harq-ACK-SpatialBundlingPUCCH is not provided, PDSCH-CodeBlockGroupTransmission is not provided, and the UE is configured by maxNrofCodeWordsScheduledByDCI with reception of two transport blocks for the active DL BWP of serving cell c,
$\tilde{o}_j^{ACK}$ = HARQ-ACK information bit corresponding to a first transport block of this cell;
j = j + 1;
$\tilde{o}_j^{ACK}$ = HARQ-ACK information bit corresponding to a second transport block of this cell;
j = j + 1;
elseif harq-ACK-SpatialBundlingPUCCH is provided, and the UE is configured by maxNrofCodeWordsScheduledByDCI with reception of two transport blocks for the active DL BWP of serving cell c,
$\tilde{o}_j^{ACK}$ = binary AND operation of the HARQ-ACK information bits corresponding to first and second transport blocks of this cell - if the UE receives one transport block, the UE assumes ACK for the second transport block;
j = j + 1;
elseif PDSCH-CodeBlockGroupTransmission is provided, and $N_{HARQ-ACK,c}^{CBG/TB,max}$ CBGs are indicated by maxCodeBlockGroupsPerTransportBlock for serving cell c,
Set $n_{CBG}$ = 0 − CBG index
while $n_{CBG}$ < $N_{HARQ-ACK,c}^{CBG/TB,max}$
$\tilde{o}_{j+n_{CBG}}^{ACK}$ = HARQ-ACK information bit corresponding to CBG $n_{CBG}$ of the first transport block;
if the UE is configured by maxNrofCodeWordsScheduledByDCI with reception of two transport blocks for the active DL BWP of serving cell c
$\tilde{o}_{j+n_{CBG}+N_{HARQ-ACK,c}^{CBG/TB,max}}^{ACK}$ = HARQ-ACK information bit corresponding to CBG $n_{CBG}$ of the second transport block;
end if
$n_{CBG} = n_{CBG} + 1$;
end while
j = j + $N_{TB,c}^{DL} \cdot N_{HARQ-ACK,c}^{CBG/TB,max}$, where $N_{TB,c}^{DL}$ is the value of maxNrofCodeWordsScheduledByDCI for the active DL BWP of serving cell c;
else
$\tilde{o}_j^{ACK}$ = HARQ-ACK information bit of serving cell c;
j = j + 1;
end if
m = m + 1;
end while
c = c + 1;
end while Hereinafter, a method of configuring the type-1 HARQ-ACK codebook in the case where time bundling is configured will be described.

First, SLIV pruning may be performed based on the last SLIVs (in each row of the TDRA table). For each DL slot corresponding to K1, if G groups are required for any of the TDRA row indexes corresponding to K1 after SLIV pruning, the number of occasions as much as (G-1) may be added to the SLIV pruning result.

For example, a TDRA entry for M-DCI in a specific cell may include a row index #0 and a row index #1. In this case, in the case of row index #0, five SLIV values may be linked, and the last SLIV may be configured as {S=0,L=5}. And, in the case of row index #1, three SLIV values are linked, and the last SLIV may be configured as {S=2,L=5}. Here, S may represent a start symbol, and L may represent a symbol length.

In addition, the TDRA entry for S-DCI in the corresponding cell may include row index #0, and the SLIV corresponding to row index #0 may consist of {S=9, L=5}.

When SLIV pruning is performed using only the last SLIVs for a specific DL slot corresponding to a specific K1 for a corresponding cell, two occasions for receiving a candidate PDSCH may be allocated to the corresponding DL slot.

When two groups are configured and M is configured to 4 as in method 1 above, since both groups are required for at least row index #0, the number of occasions for candidate PDSCH receptions may be three in the final corresponding DL slot.

For example, when row index #0 or row index #1 is scheduled by M-DCI, HARQ-ACK information related to row index #0 or row index #1 may correspond to the first two occasions among the plurality of occasions.

Here, in the case of row index #1, since there is no PDSCH corresponding to the second group, the second occasion may be filled with NACK. And when row index #0 is scheduled by S-DCI, HARQ-ACK information (corresponding to S-DCI) may correspond to the third occasion.

As another example, the TDRA entry for M-DCI in a specific cell may include row index #0 and row index #1. In this case, in the case of row index #0, five SLIV values may be linked, and the last SLIV may be configured as {S=9, L=5}. And, in the case of row index #1, three SLIV values are linked, and the last SLIV may be configured as {S=10, L=4}.

In addition, the TDRA entry for S-DCI in the corresponding cell may include row index #0, and the SLIV corresponding to row index #0 may consist of {S=0, L=5}.

When SLIV pruning is performed using only the last SLIVs for a specific DL slot corresponding to a specific K1 for a corresponding cell, two occasions for candidate PDSCH receptions may be allocated to the corresponding DL slot.

When two groups are configured and M is configured to 4 as in the above-described method 1, since both groups are required for at least row index #0, the number of occasions for candidate PDSCH receptions may be 3 in the corresponding DL slot.

When row index #0 or row index #1 is scheduled by M-DCI, HARQ-ACK information related to row index #0 or row index #1 may correspond to the first and third occasions among a plurality of occasions.

In this case, in the case of row index #1, since there is no PDSCH corresponding to the second group, the third occasion may be filled with NACK. And, when row index #0 is scheduled by S-DCI, HARQ-ACK information related to row index #0 may correspond to the second occasion.

That is, when SLIV pruning is performed using only the last SLIVs, an occasion may be allocated to row index #0 corresponding to S-DCI first. And, since the next occasion is allocated to row index #0/1 corresponding to M-DCI, a total of two occasions may be configured/allocated. Additionally, since the occasion according to time bundling is configured before the corresponding two occasions, a total of three occasions may be allocated to the corresponding DL slot.

Type-2 HARQ-ACK Codebook Configuration Method Based on M-DCI

In the case of S-DCI in a basic wireless communication system, counter-DAI (C-DAI) and total-DAI (T-DAI) values may be counted by 1 for each DCI or each PDSCH. In the case of M-DCI, since there may be a plurality of PDSCHs corresponding to one DCI, a method for counting the DAI value may vary. For example, the DAI value may be counted per DCI, counted per PDSCH, or counted in units of W PDSCHs.

Hereinafter, a method of configuring the HARQ-ACK codebook when the DAI value is counted for each DCI, and a method of configuring a single codebook/separate sub-codebook (sub-CB) for a single PDSCH case and a multi-PDSCH case will be described.

In describing the present disclosure, configuring a separate sub-CB may mean that the C/T-DAI value of each sub-CB is independently determined and signaled (i.e., the DCI/PDSCH order/total scheduled for each sub-CB is independently determined/signaled).

For example, that a separate sub-CB is configured for a single PDSCH case and a multi-PDSCH case may mean that a C/T-DAI value is independently determined and signaled for each of the single PDSCH case and the multi-PDSCH case (i.e., DCI/PDSCH sequence/total scheduled for each case is independently determined/signaled).

That is, a DCI corresponding to a single PDSCH case may be signaled by determining a DAI value only for a single PDSCH case, and a DCI corresponding to a multi-PDSCH case may be signaled by determining a DAI value only for a multi-PDSCH case.

In addition, HARQ-ACK payloads corresponding to different sub-CBs may be concatenated to form a final HARQ-ACK codebook.

And, configuring a single CB may mean that a common C/T-DAI value is determined and signaled (i.e., DCI/PDSCH order/total scheduled for a single CB is determined/signaled in common).

For example, that a single CB is configured for a single PDSCH case and a multi-PDSCH case may mean that C/T-DAI values are counted and signaled by grouping a single PDSCH case and a multi-PDSCH case (i.e., DCI/PDSCH order/total is determined/signaling scheduled without distinction for each case).

A Method of Configuring a Single CB for Single/Multi-PDSCH Cases

Hereinafter, when the DAI for each DCI is counted, a method of configuring a single codebook will be described. That is, a method of configuring a single CB for a single PDSCH case and a multi-PDSCH case will be described.

In this case, the M-DCI may maintain the existing DL DAI size(i.e., C/T-DAI 2 bits each), the S-DCI may maintain the existing DL DAI size, and the UL grant may maintain the existing UL DAI size (i.e., T-DAI 2 bits).

And, the HARQ-ACK payload may be determined by the maximum number of PDSCHs that M-DCI can schedule (Y).

For example, for a cell in which 2 TB (transport block) is configured and spatial bundling is not configured, 2 bits (2 bits per PDSCH) may be calculated/allocated for each PDSCH. And, for a cell in which 2 TB is configured but spatial bundling is configured or a cell in which 1 TB is configured, 1 bit may be calculated/allocated for each PDSCH.

That is, when X bits (here, X is the number of TBs and may be 1 or 2 depending on the spatial bundling configuration) are calculated/allocated for each PDSCH, the number of HARQ-ACK bits corresponding to one DAI may be calculated as X*Y for both a single PDSCH case and a multi-PDSCH case.

For example, when M-DCI is configured for a plurality of cells (in one cell group), the number of HARQ-ACK bits for each DAI may be determined by the maximum X*Y value among arbitrary cells.

A Method of Configuring a Single CB(Codebook) when Time Bundling is Configured

Hereinafter, when DAI for each DCI is counted and time bundling is configured, a method of configuring a single CB for a single PDSCH case and a multi-PDSCH case will be described. That is, a method of configuring the type-2 HARQ-ACK codebook when time bundling is configured will be described.

In this case, the M-DCI may maintain the existing DL DAI size (i.e., C/T-DAI 2 bits each), the S-DCI may maintain the existing DL DAI size, and the UL grant may maintain the existing UL DAI size (i.e., T-DAI 2 bits).

The HARQ-ACK payload may be determined by the (maximum) number of groups (G) configured for time bundling. The number of HARQ-ACK bits corresponding to one DAI may be G (or X*G) (X is the number of TBs set to 1 or 2 depending on spatial bundling configuration) for both a single PDSCH case and a multi-PDSCH case.

For example, if M-DCI is configured for a plurality of cells (in one cell group), the number of HARQ-ACK bits for each DAI may be determined by the maximum G (or X*G) value among arbitrary cells. For example, when a PDSCH corresponding to a specific time bundling group does not exist, NACK may be mapped.

A Method of Configuring Separate CBs for Single/Multi PDSCH Cases

Hereinafter, a method in which one sub-codebook corresponding to a single PDSCH case is configured and another sub-CB corresponding to a multi-PDSCH case is configured when DAI per DCI is counted will be described.

In this case, the M-DCI may maintain the existing DL DAI size (i.e., C/T-DAI 2 bits each), the S-DCI may maintain the existing DL DAI size, and the UL grant may additionally require 2 bits of T-DAI (for additional sub-CB) to the existing UL DAI size.

And, in the case of a sub-CB corresponding to a single PDSCH case, the number of HARQ-ACK bits per DAI may be X (X is the number of TBs and is configured to 1 or 2 according to the spatial bundling configuration). And, in the case of sub-CB corresponding to the multi-PDSCH case, the number of HARQ-ACK bits per DAI may be the maximum X*Y value among arbitrary cells (in one cell group).

A Method of Configuring Separate CBs for Single/Multi-PDSCH Cases when CBG is Established Hereinafter, when the DAI for each DCI is counted and a CBG (code block group) is configured, a method of configuring an separate CB for a single/multi-PDSCH case will be described.

Here, CBG is a grouping of one or more CBs into one group. Specifically, the PDSCH may carry one or more TBs. The TB may be coded into a codeword (CW) and then transmitted through scrambling and modulation processes. CW includes one or more code blocks (Code Block, CB). More than one CB may be bundled into one CBG.

Option 1

When a TB-based PDSCH is scheduled in a single PDSCH case, a corresponding first sub-CB may be configured. When a TB-based PDSCH is scheduled in the multi-PDSCH case, a corresponding second sub-CB may be configured. When a CBG-based PDSCH is scheduled in a single PDSCH case, a corresponding third sub-CB may be configured.

When CBG is configured in a cell in which M-DCI is configured, the DAI in M-DCI in a single-PDSCH case may indicate the C/T-DAI value for the CBG-based PDSCH. If CBG is not configured in a cell in which M-DCI is configured, the DAI in M-DCI in a single-PDSCH case may indicate the C/T-DAI value for the TB-based PDSCH.

S-DCI or M-DCI may maintain the existing DL DAI size. In addition, the UL grant may additionally require 4 bits of T-DAI (i.e., 2 bits of T-DAI for each sub-CB) to the existing UL DAI size (for two additional sub-CBs).

And, the payload of the first sub-CB in the case of scheduling the TB-based PDSCH in a single PDSCH case may be the same as the sub-CB corresponding to the single PDSCH case described above. The payload of the second sub-CB configured for the multi-PDSCH case may be the same as the sub-CB corresponding to the above-described multi-PDSCH case. In a single PDSCH case, the payload of the third sub-CB configured by CBG-based PDSCH scheduling may be the same as that of the existing CBG-based sub-CB configuration.

Option 2

When the TB-based PDSCH is scheduled in a single PDSCH case, the first sub-CB may be configured. In addition, CBG-based PDSCH scheduling through a multi-PDSCH case and a single PDSCH case may be integrated to form a second sub-CB.

When CBG is configured in a cell in which M-DCI is configured, DAI in M-DCI may indicate a C/T-DAI value for the second sub-CB in a single-PDSCH case. When CBG is not configured in a cell in which M-DCI is configured, DAI in M-DCI may indicate a C/T-DAI value for the first sub-CB in a single-PDSCH case. And, S-DCI, M-DCI, or UL grant may be the same as option 1.

And, when the configured maximum number of CBGs is C, the HARQ-ACK payload may be configured by the maximum value among the maximum value of C (max_C) corresponding to any cell (within one cell group) and the maximum value of X*Y (max_XY) corresponding to any cell (within one cell group). That is, the number of HARQ-ACK bits corresponding to the second sub-CB DAI may be determined as max{max_C, max_XY} for both the single PDSCH case and the multi-PDSCH case.

In addition, for the first sub-CB, the number of HARQ-ACK bits per DAI may be X (X is the number of TBs and is configured to 1 or 2 according to the spatial bundling configuration).

PUCCH Power Control Method in HARQ-ACK Feedback

Hereinafter, when the HARQ-ACK feedback according to the M-DCI and/or CBG configuration is transmitted through the PUCCH, a method of controlling the power of the PUCCH will be described.

In a wireless communication system, the mmWave band (e.g., 7.125 or 24.25 GHz or more, up to 52.6 GHz) may be defined as a frequency range (FR) 2 (or FR2-1). The subcarrier spacing (SCS) of the SS/PBCH block in the corresponding band may be either 120 or 240 kHz, and the SCS of other signals/channels (e.g., PDCCH, PDSCH, PUSCH, etc.) is either 60 or 120 kHz.

Larger SCSs may be used in a band (e.g., 52.6 GHz or more, up to 71 GHz) of a high frequency wireless communication system (FR 2-2). When the scalability of the OFDM symbol duration and CP length defined in the current wireless communication system is maintained, OFDM symbol duration and CP length for each SCS may be defined as shown in Table 7 below.

TABLE 7

| SCS [kHz] | 120 | 240 | 480 | 960 |
|---|---|---|---|---|
| Symbol duration | 8.33 us | 4.17 us | 2.08 us | 1.04 us |
| CP length | 586 ns | 293 ns | 146 ns | 73 ns |

In consideration of the monitoring capability of the UE in the FR2–2 frequency band, PDCCH monitoring may be performed in one slot in units of a plurality of slots. Due to this, in consideration of the reduced PDCCH monitoring occasion area, a plurality of PDSCHs may be scheduled through one DCI. However, the PDSCH indicated/scheduled through the corresponding DCI may be indicated/scheduled to be transmitted not only in the FR2–2 band but also in other FR bands.

That is, the M-DCI described in the present disclosure is not limited to the wireless communication system operating in FR2–2, but can be extended and applied to the wireless communication system operating in another frequency band.

When configuring the type-2 codebook in a basic wireless communication system, if the total number of HARQ-ACK bits is 11 or less, HARQ-ACK information bits are calculated as shown in Tables 8 to 10 below, and transmission power for PUCCH may be determined according to the calculated HARQ-ACK information bits.

TABLE 8

If a UE is not provided PDSCH-CodeBlockGroupTransmission for each of the $N_{cells}^{DL}$ serving cells, or for PDSCH receptions scheduled by a DCI format that does not support CBG-based PDSCH receptions, or for SPS PDSCH reception, or for SPS PDSCH release, or for SCell dormancy indication, and if $O_{ACK} + O_{SR} + O_{CSI} \leq 11$, the UE determines a number of HARQ-ACK information bits $n_{HARQ-ACK}$ for obtaining a transmission power for a PUCCH, as described in clause 7.2.1, as Equation (1)

$n_{HARQ} =$ $n_{HARQ-ACK,TB} = \left(\left(V_{DAI,m_{last}}^{DL} - \sum_{k=0}^{N_{cells}^{DL}-1} U_{DAI,c}\right) \bmod(T_D)\right) N_{TB,max}^{DL} + \sum_{k=0}^{N_{cells}^{DL}-1} \left(\sum_{m=0}^{M-1} N_{m,c}^{received} + N_{SPS,c}\right)$ where
- if $N_{cells}^{DL} = 1$, $V_{DAI,m_{last}}^{DL}$ is the value of the counter DAI in the last DCI format scheduling PDSCH reception or indicating SPS PDSCH release or indicating SCell dormancy, for any serving cell c that the UE detects within the M PDCCH monitoring occasions.
- if $N_{cells}^{DL} > 1$
- if the UE does not detect any DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c,
$V_{DAI,m_{last}}^{DL}$ is the value of the counter DAI in a last DCI format the UE detects in the last PDCCH monitoring occasion
- if the UE detects at least one DCI format that includes a total DAI field in a last PDCCH monitoring occasion within the M PDCCH monitoring occasions where the UE detects at least one DCI format scheduling PDSCH reception, indicating SPS PDSCH release or indicating SCell dormancy for any serving cell c,
$V_{DAI,m_{last}}^{DL}$ is the value of the total DAI in the at least one DCI format that includes a total DAI field
- $V_{DAI,m_{last}}^{DL} = 0$ if the UE does not detect any DCI format scheduling PDSCH reception, indicating SPS PDSCH release or indicating SCell dormancy for any serving cell c in any of the M PDCCH monitoring occasions.
- $U_{DAI,c}$ is the total number of a DCI format scheduling PDSCH reception, indicating SPS PDSCH release or indicating SCell dormancy that the UE detects within the M PDCCH monitoring occasions for serving cell c.
$U_{DAI,c} = 0$ if the UE does not detect any DCI format scheduling PDSCH reception, indicating SPS PDSCH release or indicating SCell dormancy for serving cell c in any of the M PDCCH monitoring occasions.
- $N_{TB,max}^{DL} = 2$ if the value of maxNrofCodeWordsScheduledByDCI is 2 for any serving cell c and harq-ACK-SpatialBundlingPUCCH is not provided; otherwise, $N_{TB,max}^{DL} = 1$.
- $N_{m,c}^{received}$ is the number of transport blocks the UE receives in a PDSCH scheduled by a DCI format that the UE detects in PDCCH monitoring occasion m for serving cell c if harq-ACK-SpatialBundlingPUCCH is not provided, or the number of PDSCH scheduled by a DCI format that the UE detects in PDCCH monitoring occasion m for serving cell c if harq-ACK-SpatialBundlingPUCCH is provided, or the number of DCI format that the UE detects and indicate SPS PDSCH release in PDCCH monitoring occasion m for serving cell c, or the number of DCI format that the UE detects and indicate SCell dormancy in PDCCH monitoring occasion m for serving cell c.
- $N_{SPS,c}$ is the number of SPS PDSCH receptions by the UE on serving cell c for which the UE transmits corresponding HARQ-ACK information in the same PUCCH as for HARQ-ACK information corresponding to PDSCH receptions within the M PDCCH monitoring occasions.

TABLE 9

If a UE
- is provided PDSCH-CodeBlockGroupTransmission for $N_{cells}^{DL,CBG}$ serving cells; and
- is not provided PDSCH-CodeBlockGroupTransmission, for $N_{cells}^{DL,TB}$ serving cells where $N_{cells}^{DL,TB} + N_{cells}^{DL,CBG} = N_{cells}^{DL}$ the UE determines the $\tilde{o}_0^{ACK}, \tilde{o}_1^{ACK}, \ldots, \tilde{o}_{O_{ACK}-1}^{ACK}$ according to the previous pseudo-code with the following modifications
- $N_{cells}^{DL}$ is used for the determination of a first HARQ-ACK sub-codebook for
- SPS PDSCH release,
- SPS PDSCH reception,
- DCI format 1_1 indicating SCell dormancy, and
- for TB-based PDSCH receptions on the $N_{cells}^{DL,CBG}$ serving cells and on the $N_{cells}^{DL,TB}$ serving cells,
- $N_{cells}^{DL}$ is replaced by $N_{cells}^{DL,CBG}$ for the determination of a second HARQ-ACK sub-codebook TABLE 9-continued corresponding to the $N_{cells}^{DL,CBG}$ serving cells for CBG-based PDSCH receptions, and
- if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ackNackFeedbackMode = joint, the serving cell is counted as two times where the first time corresponds to the first CORESETs and the second time corresponds to the second CORESETs, and
- instead of generating one HARQ-ACK information bit per transport block for a serving cell from the $N_{cells}^{DL,CBG}$ serving cells, the UE generates $N_{HARQ-ACK,max}^{CBG/TB,max}$ HARQ-ACK information bits, where $N_{HARQ-ACK,max}^{CBG/TB,max}$ is the maximum value of $N_{TB,c}^{DL} \cdot N_{HARQ-ACK,c}^{CBG/TB,max}$ across all $N_{cells}^{DL,CBG}$ serving cells and $N_{TB,c}^{DL}$ is the value of maxNrofCodeWordsScheduledByDCI for serving cell c. If for a serving cell c it is $N_{TB,c}^{DL} \cdot N_{HARQ-ACK,c}^{CBG/TB,max} <$ $N_{HARQ-ACK,max}^{CBG/TB,max}$, the UE generates NACK for the last $N_{HARQ-ACK,max}^{CBG/TB,max} - N_{TB,c}^{DL} \cdot N_{HARQ-ACK,c}^{CBG/TB,max}$ HARQ-ACK information bits for serving cell c
- the pseudo-code operation when harq-ACK-SpatialBundlingPUCCH is provided is not applicable
- The counter DAI value and the total DAI value apply separately for each HARQ-ACK sub-codebook
- The UE generates the HARQ-ACK codebook by appending the second HARQ-ACK sub-codebook to the first HARQ-ACK sub-codebook

TABLE 10

If $OACK + O_{SR} + O_{CSI} \leq 11$, the UE also determines $n_{HARQ-ACK} = n_{HARQ-ACK,TB} + n_{HARQ-ACK,CBG}$ for obtaining a PUCCH transmission power, as described in clause 7.2.1, with Equation (2)

$n_{HARQ-ACK,CBG} =$ $$\left(\left(V_{DAI,m_{last}}^{DL} - \sum_{k=0}^{N_{cells}^{DL,CBG}-1} U_{DAI,c}^{CBG}\right) \bmod(T_D)\right) N_{HARQ-ACK,max}^{CBG/TB,max} + \sum_{k=0}^{N_{cells}^{DL}-1} \sum_{m=0}^{M-1} N_{m,c}^{received,CBG}$$

where
- if $N_{cells}^{DL} = 1$, $V_{DAI,m_{last}}^{DL}$ is the value of the counter DAI in the last DCI format scheduling CBG-based PDSCH reception for any serving cell c that the UE detects within the M PDCCH monitoring occasions
- if $N_{cells}^{DL} > 1$,, $V_{DAI,m_{last}}^{DL}$ is the value of the total DAI in the last DCI format scheduling CBG-based PDSCH reception for any serving cell c that the UE detects within the M PDCCH monitoring occasions
- $V_{DAI,m_{last}}^{DL} = 0$, if the UE does not detect any DCI format scheduling CBG-based PDSCH reception for any serving cell c in any of the M PDCCH monitoring occasions
- $U_{DAI,c}^{CBG}$ is the total number of DCI formats scheduling CBG-based PDSCH receptions that the UE detects within the M PDCCH monitoring occasions for serving cell c. $U_{DAI,c}^{CBG} = 0$ if the UE does not detect any DCI format scheduling CBG-based PDSCH reception for serving cell c in any of the M PDCCH monitoring occasions
- $N_{m,c}^{received,CBG}$ is the number of CBGs the UE receives in a PDSCH scheduled by a DCI format that supports CBG-based PDSCH reception that the UE detects in PDCCH monitoring occasion m for serving cell c and the UE reports corresponding HARQ-ACK information in the PUCCH In equations (1) and (2) includes in Tables 8 and 10, the '$n_{HARQ-ACK}$' value may be determined based on the number of actually received PDSCHs (or, TBs) (the first element of each equation) and the number of missed PDSCHs (or, TBs) (the second element in each equation) (different from the actual CB size).

In this disclosure, when M-DCI and/or CBG is configured, a method of modifying the equation for calculating the $n_{HARQ-ACK}$ value will be described.

Figure 9:
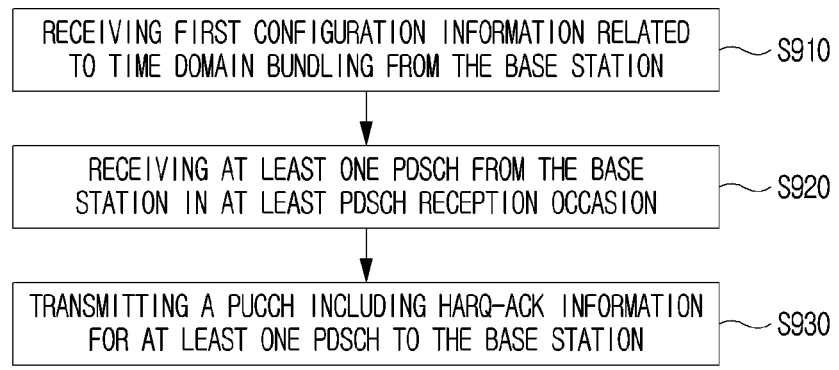
FIG. 9 is a diagram for describing downlink reception and uplink transmission operations of a UE in a wireless communication system to which the present disclosure may be applied.

FIG. 9 is a flowchart illustrating a method for a terminal (or user equipment(UE)) to perform downlink reception and uplink transmission according to an embodiment of the present disclosure.

The UE may receive first configuration information related to time domain bundling from the base station S910.

For example, when the time bundling period is configured by the first configuration information, HARQ-ACK information in the time bundling period (or duration) is bundled (e.g., bundled by AND operation, etc.) and reported to the base station, thereby reducing the HARQ-ACK payload.

As an example, the first configuration information may include 'enableTimeDomainHARQ' or an enabled 'timeDomainHARQ-BundlingType1', but is not limited thereto.

The UE may receive at least one PDSCH from the base station in at least one physical downlink shared channel (PDSCH) reception occasion S920.

Specifically, the UE may receive a PDSCH scheduled by DCI indicating a TDRA row including one or more SLIV entries at one or more PDSCH reception occasions. One or more PDSCHs may include one or more transport blocks.

The UE may transmit a PUCCH including HARQ-ACK information for at least one PDSCH to the base station (S930).

As an example, the UE may generate a HARQ-ACK codebook by concatenating HARQ-ACK information for at least one PDSCH, and transmit the PUCCH including the generated HARQ-ACK codebook to the base station.

As another example, HARQ-ACK information within the time bundling period configured by the first configuration information is bundled (e.g., bundled by AND operation, etc.), and the UE may transmit the PUCCH including the bundled HARQ-ACK information to the base station.

Here, the transmission power for the PUCCH may be based on a specific PDSCH among at least one PDSCH. That is, the transmission power for the PUCCH may be based on specific PDSCH-related information (e.g., the number of specific PDSCHs or the number of TBs included in the specific PDSCH, etc.).

The transmission power for the PUCCH may be obtained using information related to a specific PDSCH $$\left(\sum\nolimits_{c=0}^{N_{cells}^{DL}-1}\sum\nolimits_{m=0}^{M_c-1}N_{m,c}^{received}\right)$$

and the number of CBGs received from the base station $$\left(\sum\nolimits_{c=0}^{N_{cells}^{DL}-1}\sum\nolimits_{m=0}^{M_c-1}N_{m,c}^{received,CBG}\right)$$

at the at least one PDSCH reception occasion. That is, the UE may obtain the transmission power for the PUCCH by using the sum ($n_{HARQ-ACK}$) of $$\sum\nolimits_{c=0}^{N_{cells}^{DL}-1}\sum\nolimits_{m=0}^{M_c-1}N_{m,c}^{received} \text{ and}$$

$$\sum\nolimits_{c=0}^{N_{cells}^{DL}-1}\sum\nolimits_{m=0}^{M_c-1}N_{m,c}^{received,CBG}.$$

In this case, the number of bits of the UCI payload included in the PUCCH may be 11 or less. The UCI payload may include at least one of the HARQ-ACK information, scheduling request (SR) information, and channel state information (CSI) information.

A specific PDSCH may be associated with the last SLIV among at least one SLIV (entry) included in a TDRA row indicated by DCI. That is, the UE may regard only a specific PDSCH associated with the last SLIV among at least one PDSCH as a PDSCH related to PUCCH transmission power. The PDSCH related to PUCCH transmission power may mean a PDSCH for calculating/obtaining $N_{m,c}^{received}$ from $$\sum\nolimits_{c=0}^{N_{cells}^{DL}-1}\sum\nolimits_{m=0}^{M_c-1}N_{m,c}^{received}.$$

In addition, when the PDSCH received in at least one PDSCH occasion does not correspond to the last SLIV, the UE may not regard the PDSCH (that is, the remaining PDSCHs except for a specific PDSCH in at least one PDSCH) as a PDSCH related to PUCCH transmission power.

As an example, based on second configuration information related to spatial bundling and third configuration information related to code block group (CBG) transmission being not received from the base station, the transmission power for the PUCCH may be based on the number of transport blocks (TB) included in the specific PDSCH.

As another example, based on the second configuration information related to bundling being received from the base station, the transmission power for the PUCCH may be based on the number of specific PDSCHs.

As another example, based on the third configuration information related to code block group (CBG) transmission being received from the base station and DCI not supporting CGB-based PDSCH reception, transmission power for PUCCH may be based on the number of TBs included in a specific PDSCH.

Figure 10:
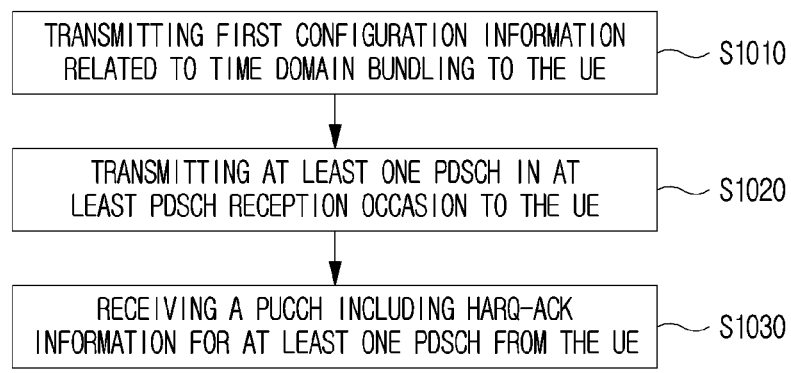
FIG. 10 is a diagram for describing downlink transmission and uplink reception operations of a base station in a wireless communication system to which the present disclosure may be applied.

FIG. 10 is a diagram for describing downlink transmission and uplink reception operations of a base station in a wireless communication system to which the present disclosure may be applied.

The base station may transmit first configuration information related to time domain bundling to the UE S1010.

The base station may transmit at least one PDSCH to the UE in at least one PDSCH reception occasion S1020.

The base station may receive a PUCCH including HARQ-ACK information for at least one PDSCH from the UE S1030.

In this case, the transmission power for the PUCCH may be based on a specific PDSCH among the at least one PDSCH. A specific PDSCH may be associated with the last SLIV among at least one SLIV included in a TDRA row indicated by DCI.

Operations and related parameters related to S1010, S1020, and S1030 correspond to S910, S920, and S930, and overlapping descriptions will be omitted.

Hereinafter, a method for controlling transmission power of PUCCH including HARQ-ACK information will be described in detail.

Embodiment 1

Embodiment 1 relates to a method of calculating the value of $n_{HARQ-ACK}$ when configuring one sub-CB corresponding to a single PDSCH case and configuring another sub-CB corresponding to a multi-PDSCH case.

Since a separate sub-CB for each case may be configured, a final value of $n_{HARQ-ACK}$ may be derived from the sum of a value of $n_{HARQ-ACK,S-PDSCH}$ corresponding to a single PDSCH case and a value of $n_{HARQ-ACK,M-PDSCH}$ corresponding to a multi-PDSCH case.

Specifically, the $n_{HARQ-ACK,S-PDSCH}$ value may be configured as in Equation 3 below, similar to Equation (1) of Table 8.

$$n_{HARQ-ACK,S-PDSCH} = \\ \left(\left(V_{DAI,m_{last}}^{DL} - \sum\nolimits_{c=0}^{N_{cells}^{DL}-1} U_{DAI,c}\right)\text{mod}(T_D)\right)N_{TB,max}^{DL} + \\ \sum\nolimits_{c=0}^{N_{cells}^{DL}-1}\left(\sum\nolimits_{m=0}^{M-1}N_{m,c}^{received} + N_{SPS,c}\right)$$

[Equation 3]

Here, $V_{DAI,M_{last}}^{DL}$ at may represent a total (or counter) DAI value indicated in the last DCI format corresponding to a single PDSCH case.

$U_{DAI,c}$ may indicate the total number of DCI format (s) corresponding to a single PDSCH case (detected by the UE during all M PDCCH occasions).

$N_{m,c}^{received}$ may mean the total number of PDSCHs or the number of TBs scheduled by DCI corresponding to a single PDSCH case.

For example, based on spatial bundling configuration information related to PUCCH (e.g., 'harq-ACK-Spatial-BundlingPUCCH') being not provided, NiWcceived may indicate the number of TBs scheduled by DCI corresponding to a single PDSCH case. As another example, based on the provision of spatial bundling configuration information related to PUCCH, $N_{m,c}^{received}$ may indicate the total number of PDSCHs scheduled by DCI corresponding to a single PDSCH case.

The remaining parameters may be the same as those disclosed in Tables 8 to 10.

As an example, when time bundling is configured for a serving cell c in which a multi-PDSCH case or M-DCI is configured, $N_{m,c}^{received}$ is the total number of PDSCHs scheduled by DCI corresponding to a single PDSCH case or the number of TBs plus the number of M-DCIs (received on the PDCCH monitoring occasion m) scheduling a cell configured to G=1 (e.g., serving cell c) (i.e., the 'maxNrofCodeWordsScheduledByDCI' value of the cell configured to G=1) (except when a plurality of PDSCHs are scheduled through M-DCI). 'maxNrofCodeWordsScheduledByDCI' may indicate the maximum number of code words that a single DCI can schedule.

As another example, it is assumed that time bundling is configured to 1 for a serving cell c in which M-DCI is configured. When the 'maxNrofCodeWordsScheduledByDCI' value is 2 and spatial bundling configuration information related to PUCCH is provided, or when G is configured to 1 for a cell with a 'maxNrofCodeWordsScheduledByDCI' value of 1, $N_{m,c}^{received}$ may be a value in which the number of M-DCIs (received on PDCCH monitoring occasion m) is added to the total number of PDSCHs or the number of TBs scheduled by DCI corresponding to a single PDSCH case (except when a plurality of PDSCHs are scheduled through M-DCI).

As another example, in the case of a cell in which the value of 'maxNrofCodeWordsScheduledByDCI' is 2 and G is configured to 1 in a state where spatial bundling configuration information related to PUCCH is not provided, $N_{m,c}^{received}$ may be a value in which twice the number of M-DCIs (received on PDCCH monitoring occasion m) is added to the total number of PDSCHs or TBs scheduled by DCI corresponding to a single PDSCH case (except when a plurality of PDSCHs are scheduled through M-DCI).

As another example, when time bundling is configured for a serving cell c in which DCI is configured (e.g., the G value is configured to 1), the 'maxNrofCodeWordsScheduledByDCI' value is 2 and spatial bundling information related to PUCCH is provided, or when the 'maxNrofCodeWordsScheduledByDCI' value is 1, $N_{m,c}^{received}$ may mean the number of DCIs (received on PDCCH monitoring occasion m).

In addition, when the 'maxNrofCodeWordsScheduledByDCI' value is 2 and spatial bundling information related to PUCCH is not provided, $N_{m,c}^{received}$ may mean twice the number of DCIs (received on the PDCCH monitoring occasion m).

Here, the number of M-DCIs or the number of DCIs may be replaced with the number of (bundled) HARQ-ACK bits.

The value of $n_{HARQ-ACK,M-PDSCH}$ may be configured as in Equation 4 similar to Equation (2) of Table 10.

[Equation 4]

$$n_{HARQ-ACK,M-PDSCH} = \left( \left( V_{DAI,m_{last}}^{DL} - \sum_{c=0}^{N_{cells}^{DL,M-DCI}-1} U_{DAI,c}^{M-DCI} \right) \mod(T_D) \right) N_{HARQ-ACK,max}^{M-DCI,max} + \sum_{c=0}^{N_{cells}^{DL}-1} \sum_{m=0}^{M-1} N_{m,c}^{received,M-PDSCH}$$

Here, $V_{DAI,m_{last}}^{DL}$ may represent the total (or counter) DAI value indicated in the last DCI format corresponding to the multi-PDSCH case.

$N_{cells}^{DL,M-DCI}$ may indicate the number of serving cells for which M-DCI is configured (or, the number of serving cells in which M-DCI is configured and G>1 number of bundling groups is configured or M-DCI is configured and time bundling is not configured).

$U_{DAI,c}^{M-DCI}$ may indicate the total number of DCI format (s) corresponding to multi-PDSCH cases (detected by the UE during all M PDCCH occasions).

$N_{m,c}^{received,M-PDSCH}$ may indicate the total number of PDSCHs or TBs received (or scheduled) by DCI (received on PDCCH monitoring occasion m) corresponding to the multi-PDSCH case.

For example, based on spatial bundling configuration information related to PUCCH (e.g., 'harq-ACK-SpatialBundlingPUCCH') being not provided, $N_{m,c}^{received}$ may indicate the number of TBs scheduled by DCI corresponding to the multi-PDSCH case. As another example, based on the provision of spatial bundling configuration information related to PUCCH, $N_{m,c}^{received}$ may indicate the total number of PDSCHs scheduled by DCI corresponding to the multi-PDSCH case.

$N_{HARQ-ACK,max}^{M-DCI,max}$ may be determined as the maximum X*Y value among any cells (in one cell group). Here, Y may represent the maximum number of PDSCHs that can be scheduled by M-DCI configured for each serving cell. And, when PUCCH spatial bundling is configured for the serving cell (or when the 'maxNrofCodeWordsScheduledByDCI' value is 1), X may be 1. And, when the value of 'maxNrofCodeWordsScheduledByDCI' is 2 while PUCCH spatial bundling is not configured for the serving cell, X may be 2.

The remaining parameters may be the same as those disclosed in Tables 8 to 10.

As an example, it is assumed that time bundling is configured to G>1 for the multi-PDSCH case. Hereinafter, for the serving cell c in which the corresponding time bundling is configured, when calculating the value of $n_{HARQ-ACK,M-PDSCH}$, the method of calculating the values of $N_{HARQ-ACK,max}^{M-DCI,max}$ and $N_{m,c}^{received,M-PDSCH}$ will be described.

$N_{HARQ-ACK,max}^{M-DCI,max}$ may be determined as the maximum X*G value among arbitrary cells (in one cell group). Here, G may represent the (maximum) number of groups configured by time bundling (configured individually for each serving cell or commonly for a serving cell). And, if PUCCH spatial bundling is configured for the serving cell, X may be 1, and if PUCCH spatial bundling is not configured for the serving cell, X may be 2.

At this time, for a cell in which M-DCI is configured but time bundling is not configured, the value of G may be replaced with the maximum number of PDSCHs that can be scheduled by the corresponding M-DCI (Y).

That is, for a cell(s) in which time bundling is not configured among a plurality of cell(s) in which M-DCI (within one PUCCH cell group) is configured, or in which time bundling is configured and a G (i.e., the number of PDSCH groups performing time bundling) value greater than 1 is configured, $N_{HARQ-ACK,max}^{M-DCI,max}$ value may be determined by the maximum value among the Q values calculated for each cell.

In this case, in the case of a cell in which M-DCI is configured but time bundling is not configured, the Q value may be calculated as the product of the maximum number of PDSCHs that the corresponding M-DCI can schedule and X. For example, X may be 2 for a cell in which 2 TB is configured and spatial bundling is not configured, and X may be 1 in a cell in which 2 TB is configured but spatial bundling is configured or 1 TB is configured.

And, in the case of a cell in which M-DCI is configured and time bundling is configured to a G value greater than 1, the Q value may be calculated as a product of G and X. In this case, X may be 1 or 2 according to the number of TBs and spatial bundling configuration as described above.

$N_{m,c}^{received,M-PDSCH}$ may mean the number of (time bundling) groups received from DCI corresponding to the multi-PDSCH case. Alternatively, if there is M-DCI (scheduling a plurality of PDSCHs) received on the PDCCH monitoring occasion m for the serving cell c, $N_{m,c}^{received,M-PDSCH}$ may mean the number of time bundling groups configured for the corresponding serving cell c.

It is assumed that the maximum number of PDSCHs that can be scheduled by M-DCI for the serving cell c is 8, and the maximum number of configured (time bundling) groups is 2. When the number of time bundling groups generated with PDSCHs actually scheduled through the corresponding M-DCI is one (when M-DCI (scheduling a plurality of PDSCHs) is detected on PDCCH reception occasion m on the corresponding serving cell c), the N value (e.g., $N_{m,c}^{received,M-PDSCH}$) for the cell may be 1 (or 2 regardless of the number of scheduled PDSCHs).

For example, when multiple PDSCHs are scheduled by M-DCI, 2 TB scheduling is possible and PUCCH spatial bundling is not configured (when M-DCI (scheduling a plurality of PDSCHs) is detected on the PDCCH reception occasion m on the corresponding serving cell c), the value of N (e.g., $N_{m,c}^{received,\ M-PDSCH}$) may be 2 (or 4 regardless of the number of scheduled PDSCHs).

As another example, it is assumed that the number of K bundling groups is configured for the serving cell c and M UEs detect M-DCI (scheduling a plurality of PDSCHs on the serving cell c) received on the PDCCH monitoring occasion m.

At this time, when the 'maxNrofCodeWordsScheduled-ByDCI' value is 2 and spatial bundling for PUCCH is configured or the 'maxNrofCodeWordsScheduledByDCI' value is 1, the $N_{m,c}^{received,M-PDSCH}$ value may be K*M.

Alternatively, when the 'maxNrofCodeWordsScheduled-ByDCI' value is 2 and spatial bundling for PUCCH is not configured, the value of $N_{m,c}^{received,M-PDSCH}$ may be 2*K*M.

When G=1 is configured for all cells (within the same PUCCH cell group) in which M-DCI is configured, the value of $n_{HARQ-ACK,M-PDSCH}$ may not be considered when calculating power for PUCCH.

Embodiment 2

As in option 1, when scheduling a TB-based PDSCH in a single PDSCH case, a first sub-CB for the corresponding PDSCH may be configured. When scheduling TB-based PDSCH(s) in a multi-PDSCH case, a second sub-CB for the corresponding PDSCH(s) may be configured. When scheduling a CBG-based PDSCH in a single PDSCH case, a third sub-CB may be configured. In this case, Embodiment 2 relates to a method of calculating the value of $n_{HARQ-ACK}$.

A final $n_{HARQ-ACK}$ value may be derived as the sum of n values corresponding to separate sub-CBs. For example, in a single PDSCH case, the final $n_{HARQ-ACK}$ value may be derived as the sum of the n value $n_{HARQ-ACK,S-PDSCH\ \&\ TB}$ corresponding to the TB-based PDSCH case, the n value $n_{HARQ-ACK,M-PDSCH}$ corresponding to the multi-PDSCH case, and the n value $n_{HARQ-ACK,CBG}$ corresponding to the CBG-based PDSCH case in the single PDSCH case.

Specifically, the value of $n_{HARQ-ACK,S-PDSCH\ \&\ TB}$ may be the same as n $n_{HARQ-ACK,S-PDSCH}$ in Embodiment 1. In particular, when calculating the value of $n_{HARQ-ACK,S-PDSCH\ \&\ TB}$, a DCI corresponding to a single PDSCH case may mean a TB-based PDSCH scheduling DCI. In addition, the value of $n_{HARQ-ACK,M-PDSCH}$ may be the same as that of $n_{HARQ-ACK,M-PDSCH}$ of Embodiment 1.

And, the value of $n_{HARQ-ACK,CBG}$ may be the same as $n_{HARQ-ACK,CBG}$ in Equation (2) of Table 10.

Embodiment 3

As in option 2, when a TB-based PDSCH is scheduled in a single PDSCH case, the first sub-CB may be configured. In addition, a second sub-CB in which CBG-based PDSCH scheduling based on a multi-PDSCH case and a single PDSCH case is integrated may be configured. In this case, Embodiment 3 relates to a method of calculating the value of $n_{HARQ-ACK}$.

A final $n_{HARQ-ACK}$ value may be derived from the sum of $n_{HARQ-ACK,S-PDSCH\ \&\ TB}$, which is the value of n corresponding to the TB-based PDSCH in a single PDSCH case, and $n_{HARQ-ACK,M-PDSCH/CBG}$, which is the value of n corresponding to the CBG-based PDSCH in the multi-PDSCH case.

Specifically, the value of $n_{HARQ-ACK,S-PDSCH\ \&\ TB}$ may be the same as $n_{HARQ-ACK,S-PDSCH}$ of Embodiment 1. In particular, when calculating the value of $n_{HARQ-ACK,S-PDSCH\ \&\ TB}$, a DCI corresponding to a single PDSCH case may mean a TB-based PDSCH scheduling DCI.

In addition, the value of $n_{HARQ-ACK,M-PDSCH/CBG}$ may be determined by Equation 5 similar to Equation (2) of Table 10.

$$n_{HARQ-ACK,M-PDSCH/CBG} = \\ \left(\left(V_{DAI,m_{last}}^{DL} - \sum_{k=0}^{N_{cells}^{DL,M-DCI/CBG}-1} U_{DAI,c}^{M-DCI/CBG}\right) \mod(T_D)\right) \\ N_{HARQ-ACK,max}^{M-DCI/CBG,max} + \sum_{k=0}^{N_{cells}^{DL}-1} \sum_{m=0}^{M_c-1} N_{m,c}^{received,M-PDSCH} + \\ \sum_{k=0}^{N_{cells}^{DL}-1} \sum_{m=0}^{M_c-1} N_{m,c}^{received,CBG}$$

[Equation 5]

At this time, $V_{DAL,m_{last}}^{DL}$ may represent the total (or counter) DAI value indicated in the last DCI format corresponding to the multi-PDSCH case or CBG-based PDSCH.

$N_{cells}^{DL,M-DCI/CBG}$ may indicate the number of serving cells in which M-DCI or CBG is configured.

$U_{DAI,c}^{M-DCI,CBG}$ may indicate the total number of DCI format(s) corresponding to a multi-PDSCH case (detected by the UE) or a CBG-based PDSCH.

$N_{m,c}^{received,M-PDSCH}$ may mean the total number of PDSCHs or the number of TBs received from DCI corresponding to the multi-PDSCH case.

For example, based on spatial bundling configuration information related to PUCCH (e.g., 'harq-ACK-Spatial-BundlingPUCCH') being not provided, $N_{m,c}^{received,M-PDSCH}$ may indicate the number of TBs scheduled by DCI corresponding to the multi-PDSCH case. As another example, based on spatial bundling configuration information related to PUCCH being provided, $N_{m,c}^{received,M-PDSCH}$ may represent the total number of PDSCHs scheduled by DCI corresponding to the multi-PDSCH case..

In addition, $N_{HARK-ACK,max}^{M-DCI/CBG,max}$ may be determined as the maximum value among $N_{HARK-ACK,max}^{M-DCI,max}$ calculated in embodiment 1 and $N_{HARK-ACK,max}^{CBG/TB,max}$. calculated in Equation (2) of Table 10. Other parameters may be the same as those of Table 10.

Embodiment 4

Embodiment 4 relates to a method of calculating a value of $n_{HARQ-ACK}$ when a single CB can be configured for a single PDSCH case and a multi-PDSCH case when time bundling is configured.

For example, when CBG is configured, a separate sub-CB may be configured for CBG-based PDSCH scheduling. A final $n_{HARQ-ACK}$ value may be derived from the sum of $n_{HARQ-ACK,S/M-PDSCH\ \&\ TB}$, which is a value of n, corresponding to a TB-based PDSCH in a single/multi-PDSCH case, and $n_{HARQ-ACK,CBG}$, which is a value of n, which corresponds to a CBG-based PDSCH, in a single PDSCH case.

Specifically, the value of $n_{HARQ-ACK,CBG}$ may be the same as $n_{HARQ-ACK,CBG}$ in Equation (2) of Table 10. If CBG is not configured in the same PUCCH group, $n_{HARQ-ACK,CBG}$ may not be considered.

The value of $n_{HARQ-ACK,S/M-PDSCH\ \&\ TB}$ may be determined based on a number of identified missed PDSCHs (or TBs), the number of received PDSCHs corresponding to a single PDSCH case, and the number of bundled HARQ-ACK bits corresponding to the multi-PDSCH case (or the number of HARQ-ACK bits generated based on time bundling of a plurality of PDSCHs scheduled with DCI corresponding to the multi-PDSCH case).

As an example, $n_{HARQ-ACK,S/M-PDSCH\ \&\ TB}$ may be determined by Equation 6 similar to Equation (1) of Table 8.

$$n_{HARQ-ACK,S/M-PDSCH\&TB} = \left(\left(V_{DAI,m_{last}}^{DL} - \sum_{c=0}^{N_{cells}^{DL}-1} U_{DAI,c}\right)\bmod(T_D)\right)N_{TB-group,max}^{DL} + \sum_{c=0}^{N_{cells}^{DL}-1}\left(\sum_{m=0}^{M-1} N_{m,c}^{received,S-PDSCH} + N_{SPS,c} + \sum_{m=0}^{M-1} N_{m,c}^{received,M-PDSCH}\right)$$

[Equation 6]

In this case, $V_{DAI,mlast}^{DL}$ may indicate the total (or counter) DAI value indicated in the last DCI format corresponding to the TB-based PDSCH scheduling or multi-PDSCH case in a single PDSCH case.

$U_{DAI,c}$ may mean the total number of DCI format (s) corresponding to TB-based PDSCH scheduling or multi-PDSCH case in a single PDSCH case (detected by the UE).

Additionally, the $N_{TB-group,max}$, $N_{m,c}^{received,\ S-PDSCH}$ and $N_{m,c}^{received,\ M-PDSCH}$ values may be determined according to a method to be described later, and other parameters may be the same as those of Tables 8 to 10.

$N_{TB-group,max}^{DL}$ may be determined as the maximum X*G value among arbitrary cells (in one cell group). Here, G may mean the (maximum) number of groups configured for time bundling (configured separately or commonly for each serving cell). And, when PUCCH spatial bundling is configured in the corresponding serving cell, X may be 1, and when PUCCH spatial bundling is not configured in the corresponding serving cell, X may be 2. And, when G=1, $N_{TB\_group,max}$ may be the same as $N_{TB,max}^{DL}$ in Equation (1) of Table 8

$N_{m,c}^{received,\ S-PDSCH}$ may indicate the number of TBs or PDSCHs received from DCI corresponding to a single PDSCH case. As disclosed in Tables 8 to 10, $N_{m,c}^{received,\ S-PDSCH}$ may be the number of TBs or the number of PDSCHs according to 2-TB transmission and PUCCH spatial bundling configuration as in $N_{m,c}^{received}$.

$N_{m,c}^{received,\ M-PDSCH}$ may indicate the number of (time bundling) groups received by DCI corresponding to the multi-PDSCH case.

As an example, it is assumed that the maximum number of PDSCHs that can be scheduled by the M-DCI for the serving cell c is 8 and the configured maximum number of groups is 2. When the number of time bundling groups generated with PDSCHs actually scheduled through the corresponding M-DCI is one, the N value (e.g., $N_{m,c}^{received,\ M-PDSCH}$) for the cell may be 1 (or 2 regardless of the number of scheduled PDSCHs).

As another example, it is assumed that multiple PDSCHs are scheduled by M-DCI. When 2 TB scheduling is possible by the corresponding DCI and PUCCH spatial bundling is not configured, the value of N (e.g., $N_{m,c}^{received,\ M-PDSCH}$) may be 2 (or 4 regardless of the number of scheduled PDSCHs).

For example, if the maximum number of groups is one, the corresponding N value (e.g., $N_{m,c}^{received,\ M-PDSCH}$) may mean the number of received bundled TBs.

As another example, if the maximum number of groups is 1, the corresponding N value (e.g., $N_{m,c}^{received,\ M-PDSCH}$) may be determined by the number of DCIs (=Q) corresponding to the multi-PDSCH case received by the UE. For example, if 2-TB indication/scheduling is possible in the corresponding DCI and PUCCH spatial bundling is not configured, the corresponding N value (e.g., $N_{m,c}^{received,\ M-PDSCH}$) may be 2*Q. And, for example, when 2-TB indication/scheduling is not possible in the DCI or when PUCCH spatial bundling is configured, the corresponding N value (e.g., $N_{m,c}^{received,\ M-PDSCH}$) may be Q.

The above-described method may be applied when G=1 is configured for all cells (within the same PUCCH cell group) for which M-DCI is configured.

Embodiment 5

Embodiment 5 relates to a method of calculating a value of $n_{HARQ-ACK}$ in a type-1 HARQ-ACK codebook when time bundling is configured for M-DCI or CBG is configured.

In the case of the Tyep-1 HARQ-ACK codebook, when the total HARQ-ACK codebook size is 11 bits or less, the value of $n_{HARQ-ACK}$ may be determined as shown in Table 11 below.

TABLE 11

If $O_{ACK} + O_{SR} + O_{CSI} \leq 11$, the UE determines a number of HARQ-ACK information bits $n_{HARQ-ACK}$ for obtaining a transmission power for a PUCCH, as described in clause 7.2.1, as $$n_{HARQ-ACK} = \sum_{c=0}^{N_{cells}^{DL}-1}\sum_{m=0}^{M_c-1} N_{m,c}^{received} + \sum_{c=0}^{N_{cells}^{DL}-1}\sum_{m=0}^{M_c-1} N_{m,c}^{received,CBG} \text{ where}$$

- $N_{m,c}^{received}$ is the number of transport blocks the UE receives in PDSCH reception occasion m for serving cell c if harq-ACK-SpatialBundlingPUCCH and PDSCH-CodeBlockGroupTransmission are not provided, or the number of transport blocks the UE receives in PDSCH reception occasion m for serving cell c if PDSCH-CodeBlockGroupTransmission is provided and the PDSCH reception is scheduled by a DCI format that does not support CBG-based PDSCH receptions, or the number of PDSCH receptions if harq-ACK-SpatialBundlingPUCCH is provided or SPS PDSCH release in PDSCH reception occasion m for serving cell c and the UE reports corresponding HARQ-ACK information in the PUCCH.
- $N_{m,c}^{received,\ CBG}$ is the number of CBGs the UE receives in a PDSCH reception occasion m for serving cell c if PDSCH-CodeBlockGroupTransmission is provided and the PDSCH reception is scheduled by a DCI format that supports CBG-based PDSCH receptions and the UE reports corresponding HARQ-ACK information in the PUCCH.

If time bundling is configured for M-DCI or CBG is configured, $n_{HARQ-ACK}$ may be determined based on the number of received PDSCHs corresponding to a single PDSCH case, the number of bundled HARQ-ACK bits corresponding to a multi-PDSCH case (or the number of HARQ-ACK bits generated based on time bundling of a plurality of PDSCHs scheduled with DCI corresponding to the multi-PDSCH case), and the number of received CBGs.

The value of $n_{HARQ-ACK}$ may be determined as in Equation 7 below.

$$n_{HARQ-ACK} = \sum_{c=0}^{N_{cells}^{DL}-1} \sum_{m=0}^{M-1} N_{m,c}^{received,S-PDSCH} + \sum_{c=0}^{N_{cells}^{DL}-1} \sum_{m=0}^{M-1} N_{m,c}^{received,M-PDSCH} + \sum_{c=0}^{N_{cells}^{DL}-1} \sum_{m=0}^{M-1} N_{m,c}^{received,CBG} \quad \text{[Equation 7]}$$

At this time, $N_{m,c}^{received, CBG}$ may be the same as $N_{m,c}^{received,CBG}$ Table 11. The $N_{m,c}^{received, S-PDSCH}$ and $N_{m,c}^{received, M-PDSCH}$ values may be the same as the $N_{m,c}^{received, S-PDSCH}$ and $N_{m,c}^{received, M-PDSCH}$ values of Embodiment 4.

Additionally or alternatively, considering that only G=1 can be configured for the type-1 HARQ-ACK codebook, the equation in Table 11 is maintained, but the $N_{m,c}^{received}$ value may be calculated in a new way.

As an example, it is assumed that time domain bundling is configured (that is, the higher layer parameter 'enableTimeDomainHARQ-Bundling' is configured) for the serving cell c. At this time, the $N_{m,c}^{received}$ value may indicate the number of TBs (when 'harq-ACK-SpatialBundlingPUCCH' is not configured) or PDSCHs (when 'harq-ACK-SpatialBundlingPUCCH' is configured) corresponding to the last SLIV (of the TDRA row index indicated in the associated DCI format) received (or scheduled) by the UE in the PDSCH reception occasion m.

That is, even if the UE receives the PDSCH in the PDSCH reception occasion m, if the corresponding PDSCH does not correspond to the last SLIV (of the TDRA row index indicated in the associated DCI format), the $N_{m,c}^{received}$ value may not be increased due to the corresponding PDSCH.

Here, the last SLIV may mean the last SLIV based on the SLIVs configured in the indicated TDRA table index.

As another example, the last SLIV may mean the last SLIV among SLIVs other than an invalid SLIV among SLIVs configured in the indicated TDRA table index. Here, the invalid SLIV may mean a SLIV overlapping with a UL symbol configured by a specific higher layer signaling (e.g., 'tdd-UL-DL-ConfigurationCommon' or 'tdd-UL-DL-ConfigurationDedicated') even if it is one symbol.

Figure 11:
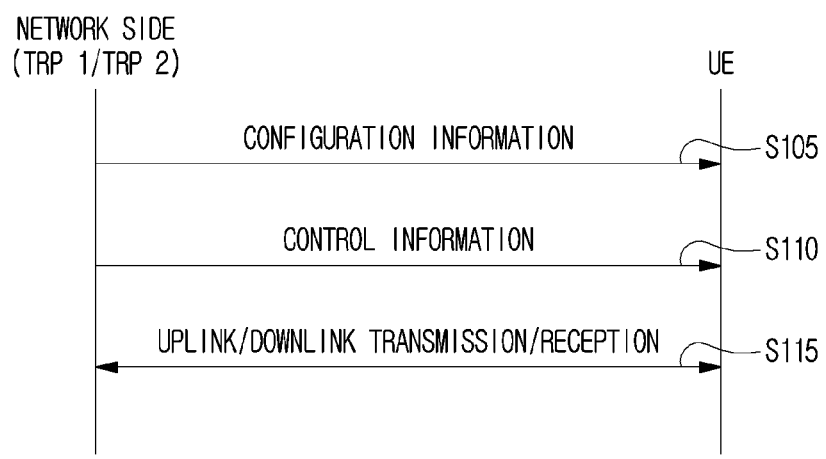
FIG. 11 is a diagram for describing a signaling procedure of a network side and a UE according to an embodiment of the present disclosure.

FIG. 11 is a diagram for describing a signaling procedure of a network side and a UE according to an embodiment of the present disclosure.

FIG. 11 represents an example of signaling between UE and a network side in M-TRP situation to which embodiments of the present disclosure (e.g., embodiment 1/embodiment 2/embodiment 3/embodiment 4/embodiment 5, or a combination of one or more of the detailed examples thereof) may be applied.

Figure 12:
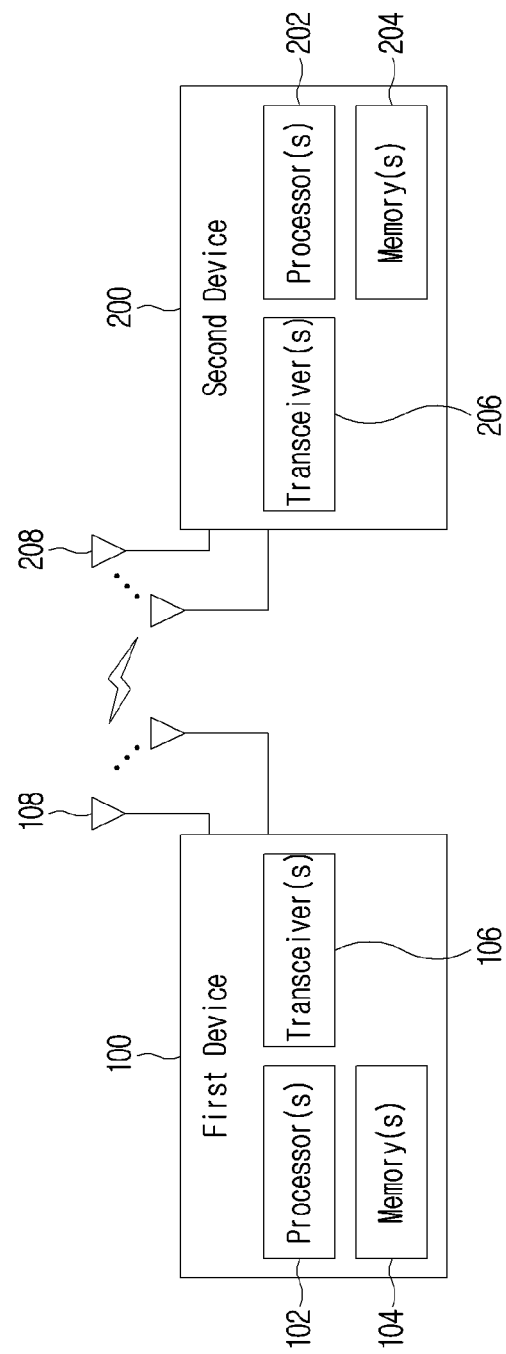
FIG. 12 illustrates a block diagram of a wireless communication device according to an embodiment of the present disclosure.

Here, UE/a network side is illustrative and may be applied by being substituted with a variety of devices as described by referring to FIG. 12. FIG. 11 is for convenience of description, and it does not limit a scope of the present disclosure. In addition, some step(s) shown in FIG. 11 may be omitted according to a situation and/or a configuration, etc. In addition, the above-described uplink transmission and reception operation, a MTRP-related operation, etc. may be referred to or used for an operation of a network side/UE in FIG. 11.

In the following description, a network side may be one base station including a plurality of TRPs or may be one cell including a plurality of TRPs. Alternatively, a network side may include a plurality of RRHs (remote radio head)/RRUs (remote radio unit). In an example, an ideal/non-ideal backhaul may be configured between TRP 1 and TRP 2 configuring a network side. In addition, the following description is described based on a plurality of TRPs, but it may be equally extended and applied to transmission through a plurality of panels/cells and may be extended and applied to transmission through a plurality of RRHs/RRUs, etc.

In addition, it is described based on a "TRP" in the following description, but as described above, a "TRP" may be applied by being substituted with an expression such as a panel, an antenna array, a cell (e.g., a macro cell/a small cell/a pico cell, etc.), a TP (transmission point), a base station(gNB, etc.), etc. As described above, a TRP may be classified according to information on a CORESET group (or a CORESET pool) (e.g., a CORESET index, an ID).

In an example, when one UE is configured to perform transmission and reception with a plurality of TRPs (or cells), it may mean that a plurality of CORESET groups (or CORESET pools) are configured for one UE. A configuration on such a CORESET group (or a CORESET pool) may be performed through higher layer signaling (e.g., RRC signaling, etc.).

In addition, a base station may generally mean an object which performs transmission and reception of data with a terminal. For example, the base station may be a concept which includes at least one TP(Transmission Point), at least one TRP(Transmission and Reception Point), etc. In addition, a TP and/or a TRP may include a panel, a transmission and reception unit, etc. of a base station.

UE may receive configuration information through/by using TRP1 and/or TRP2 from a network side S105.

For example, the configuration information may include information related to a network-side configuration (i.e., TRP configuration), resource allocation information related to M-TRP-based transmission and reception, and the like. The configuration information may be transmitted through a higher layer (e.g., RRC, MAC CE). The configuration information may include information related to uplink transmission based on a configured grant (CG). In addition, when the configuration information is predefined or configured, the corresponding step may be omitted.

As another example, the configuration information may include at least one of information related to time domain bundling (e.g., 'enableTimeDomainHARQ'), information related to spatial bundling (e.g., 'harq-ACK-SpatialBundlingPUCCH'), and information related to CBG transmission (e.g., 'PDSCH-CodeBlockGroupTransmission').

For example, an operation that UE (100 or 200 in FIG. 12) in the above-described steps S105 receives the configuration information from a network side (200 or 100 in FIG. 12) may be implemented by a device in FIG. 12 which will be described after. For example, in reference to FIG. 12, at least one processor 102 may control at least one transceiver 106 and/or at least one memory 104, etc. to receive the configuration information and at least one transceiver 106 may receive the configuration information from a network side.

The UE may receive control information from the network side S110. For example, the UE may receive DCI for scheduling uplink/downlink from the network side. In this case, DCI may indicate a TDRA row including one or more SLIV items. And, the DCI may schedule the PDSCH transmitted to the UE in the PDSCH reception occasion.

In addition, when the control information is predefined or configured, the corresponding step may be omitted.

For example, the operation of the UE (100 or 200 in FIG. 12) of the above-described step S110 receiving the control information from the network side (200 or 100 in FIG. 12) may be implemented by the apparatus of FIG. 12 to be described below. For example, referring to FIG. 12, The one or more processors 102 may control one or more transceivers 106 and/or one or more memories 104, etc. to receive the control information, and the one or more transceivers 106 may receive the control information from a network side.

The UE may transmit an uplink to the network side or receive a downlink S115.

The UE may receive at least one PDSCH from the base station at the PDSCH reception occasion. And, the UE may transmit a PUCCH including HARQ-ACK for at least one PDSCH to the base station.

In this case, the transmission power for the PUCCH may be based on a specific PDSCH among at least one PDSCH. A specific PDSCH may be associated with the last SLIV among at least one SLIV included in a TDRA row indicated by DCI.

The UE may perform uplink transmission or downlink reception based on embodiments of the present disclosure (e.g., Embodiment 1, Embodiment 2, Embodiment 3, Embodiment 4, Embodiment 5, or a combination of one or more of detailed embodiments thereof).

For example, the operation in which the UE (100 or 200 in FIG. 12) transmits an uplink to the network side (200 or 100 in FIG. 12) or receives a downlink from the network side (200 or 100 in FIG. 12) in step S115 described above may be implemented by the apparatus of FIG. 12 to be described below.

For example, referring to FIG. 12, the one or more processors 102 may control one or more transceivers 106 and/or one or more memories 104 to transmit an uplink or receive a downlink, and the one or more transceivers 106 to transmit an uplink or receive a downlink to the network side General Device to which the Present Disclosure May be Applied FIG. 12 is a diagram which illustrates a block diagram of a wireless communication system according to an embodiment of the present disclosure.

In reference to FIG. 12, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

The invention claimed is:

1. A method comprising:
receiving, by a user equipment (UE) from a base station, first configuration information related to time domain bundling;
receiving, by the UE from the base station, at least one physical downlink shared channel (PDSCH) including at least one transport block in at least one PDSCH reception occasion for at least one serving cell; and
based on the time domain bundling being enabled through the first configuration information, transmitting, by the UE to the base station, a physical uplink control channel (PUCCH) including hybrid automatic repeat request-acknowledgement (HARQ-ACK) information for the at least one PDSCH,
wherein transmission power for the PUCCH is based on a number of PDSCHs
associated with a last start and length indicator value (SLIV) of at least one SLIV among the at least one PDSCH for the at least one serving cell or a number of transport blocks associated with the last SLIV among the at least one transport block for the at least one serving cell,
wherein the at least one SLIV is included in a time domain resource allocation (TDRA) row indicated by downlink control information (DCI).

2. The method of claim 1, wherein:
based on second configuration information related to spatial bundling and third configuration information related to code block group (CBG) transmission being not received from the base station, the transmission power for the PUCCH is based on the number of transport blocks (TBs) associated with the last SLIV for the at least one serving cell.

3. The method of claim 1, wherein:
based on second configuration information related to spatial bundling being received from the base station, the transmission power for the PUCCH is based on a number of the number of PDSCHs associated with the last SLIV for the at least one serving cell.

4. The method of claim 1, wherein:
based on third configuration information related to CBG transmission being received from the base station and the DCI not supporting CBG-based PDSCH reception, the transmission power for the PUCCH is based on a number of TBs associated with the last SLIV for the at least one serving cell.

5. The method of claim 1, wherein:
the transmission power for the PUCCH is obtained by using a sum of the number of transport blocks associated with the last SLIV or the number of transport blocks with the last SLIV for the at least one serving cell and a number of CBGs received from the base station in the at least one PDSCH reception occasion for the at least one serving cell.

6. The method of claim 1, wherein:
a remaining PDSCH which is not associated with the last SLIV among the at least one PDSCH is not considered as a PDSCH related to the transmission power for the PUCCH.

7. The method of claim 1, wherein:
a number of bits of a UCI payload included in the PUCCH is 11 or less, and
the UCI payload includes at least one of the HARQ-ACK information, scheduling request (SR) information, or channel state information (CSI) information.

8. A user equipment (UE) comprising:
at least one transceiver; and
at least one processor connected to the at least one transceiver,
wherein the processor is configured to:
receive, from a base station, first configuration information related to time domain bundling through the transceiver;
receive, from the base station, at least one physical downlink shared channel (PDSCH) in at least one PDSCH reception occasion for at least one serving cell through the transceiver; and
based on the time domain bundling being enabled through the first configuration information, transmit, to the base station, a physical uplink control channel (PUCCH) including hybrid automatic repeat request-acknowledgement (HARQ-ACK) information for the at least one PDSCH through the transceiver,
wherein transmission power for the PUCCH is based on a number of PDSCHs
associated with a last start and length indicator value (SLIV) of at least one SLIV among the at least one PDSCH for the at least one serving cell or a number of transport blocks associated with the last SLIV among the at least one transport block for the at least one serving cell,
wherein the at least one SLIV is included in a time domain resource allocation (TDRA) row indicated by downlink control information (DCI).

9. A method comprising:
transmitting, by a base station to a user equipment (UE), first configuration information related to time domain bundling;

transmitting, by the base station to the UE, at least one physical downlink shared channel (PDSCH) in at least one PDSCH reception occasion for at least one serving cell; and based on the time domain bundling being enabled through the first configuration information, receiving, by the base station from the UE, a physical uplink control channel (PUCCH) including hybrid automatic repeat request-acknowledgement (HARQ-ACK) information for the at least one PDSCH, wherein transmission power for the PUCCH is based on a number of PDSCHs associated with a last start and length indicator value (SLIV) of at least one SLIV among the at least one PDSCH for the at least one serving cell or a number of transport blocks associated with the last SLIV among the at least one transport block for the at least one serving cell, wherein the at least one SLIV is included in a time domain resource allocation (TDRA) row indicated by downlink control information (DCI).

10. A base station comprising:
at least one transceiver; and
at least one processor connected to the at least one transceiver,
wherein the processor is configured to:
transmit, to a user equipment (UE), first configuration information related to time domain bundling through the transceiver;

based on the time domain bundling being enabled through the first configuration information, transmit, to the UE, at least one physical downlink shared channel (PDSCH) in at least one PDSCH reception occasion through the transceiver; and receive, from the UE, a physical uplink control channel (PUCCH) including hybrid automatic repeat request-acknowledgement (HARQ-ACK) information for the at least one PDSCH through the transceiver, wherein transmission power for the PUCCH is based on a number of PDSCHs associated with a last start and length indicator value (SLIV) of at least one SLIV among the at least one PDSCH for the at least one serving cell or a number of transport blocks associated with the last SLIV among the at least one transport block for the at least one serving cell, wherein the at least one SLIV is included in a time domain resource allocation (TDRA) row indicated by downlink control information (DCI).

11. A processing device configured to control a user equipment (UE), the processing device comprising:
at least one processor; and
at least one computer memory operatively coupled to the at least one processor and storing instructions for performing operations upon being executed by the at least one processor, wherein the operations comprise:
receiving, from a base station, first configuration information related to time domain bundling;

receiving, from the base station, at least one physical downlink shared channel (PDSCH) including at least one transport block in at least one PDSCH reception occasion for at least one serving cell; and based on the time domain bundling being enabled through the first configuration information, transmitting, to the base station, a physical uplink control channel (PUCCH) including hybrid automatic repeat request-acknowledgement (HARQ-ACK) information for the at least one PDSCH, wherein transmission power for the PUCCH is based on a number of PDSCHs associated with a last start and length indicator value (SLIV) of at least one SLIV among the at least one PDSCH for the at least one serving cell or a number of transport blocks associated with the last SLIV among the at least one transport block for the at least one serving cell, wherein the at least one SLIV is included in a time domain resource allocation (TDRA) row indicated by downlink control information (DCI).

12. At least one non-transitory computer readable medium storing at least one instruction, wherein:
the at least one instruction executed by at least one processor controls a device to perform:

receiving, from a base station, first configuration information related to time domain bundling;

receiving, from the base station, at least one physical downlink shared channel (PDSCH) including at least one transport block in at least one PDSCH reception occasion for at least one serving cell; and based on the time domain bundling being enabled through the first configuration information, transmitting, to the base station, a physical uplink control channel (PUCCH) including hybrid automatic repeat request-acknowledgement (HARQ-ACK) information for the at least one PDSCH, wherein transmission power for the PUCCH is based on a number of PDSCHs associated with a last SLIV (start and length indicator value (SLIV) of at least one SLIV among the at least one PDSCH for the at least one serving cell or a number of transport blocks associated with the last SLIV among the at least one transport block for the at least one serving cell, wherein the at least one SLIV is included in a time domain resource allocation (TDRA) row indicated by downlink control information (DCI).

* * * * *